United States Patent
Einaudi et al.

(10) Patent No.: US 12,306,688 B2
(45) Date of Patent: May 20, 2025

(54) DEVICE STATE DETERMINATION BASED ON POWER SIGNATURES

(71) Applicant: Caavo Inc, Milpitas, CA (US)

(72) Inventors: Andrew E. Einaudi, Scotts Valley, CA (US); Shivam Khandelwal, Jaipur (IN); Ashish D. Aggarwal, Stevenson Ranch, CA (US); Sharath H. Satheesh, Bangalore (IN)

(73) Assignee: Caavo Inc, Milpitas, CA (US)

( * ) Notice: Subject to any disclaimer, the term of this patent is extended or adjusted under 35 U.S.C. 154(b) by 51 days.

(21) Appl. No.: 17/934,312

(22) Filed: Sep. 22, 2022

(65) Prior Publication Data

US 2023/0091426 A1 Mar. 23, 2023

Related U.S. Application Data

(60) Provisional application No. 63/247,622, filed on Sep. 23, 2021.

(51) Int. Cl.
*G06F 1/30* (2006.01)
*G06F 1/28* (2006.01)

(52) U.S. Cl.
CPC . *G06F 1/30* (2013.01); *G06F 1/28* (2013.01)

(58) Field of Classification Search
CPC ..... G06F 1/28; G06F 1/30; G06F 1/26; G06F 1/3206; G06F 1/3209; G06F 1/3215; G06F 1/3231; G06F 1/3234; G06F 1/266
See application file for complete search history.

(56) References Cited

U.S. PATENT DOCUMENTS

| | | | | |
|---|---|---|---|---|
| 2016/0141810 A1* | 5/2016 | Kashyap | ........... | H01R 13/665 |
| | | | | 439/620.01 |
| 2018/0234637 A1* | 8/2018 | Marino | ........... | H04N 5/63 |
| 2019/0086979 A1* | 3/2019 | Kao | ........... | G06F 9/4416 |
| 2020/0004309 A1* | 1/2020 | Moritomo | ........... | G06F 1/30 |
| 2022/0353433 A1* | 11/2022 | Marino | ........... | G06F 3/167 |

\* cited by examiner

*Primary Examiner* — Raymond N Phan
(74) *Attorney, Agent, or Firm* — Sterne, Kessler, Goldstein & Fox P.L.L.C.

(57) ABSTRACT

Methods, systems, and apparatuses are described herein for the automatic determination of a state of a consumer electronic device via power monitoring. A switching device receives a power signature signal associated with a consumer electronic device. The power signature signal is compared to one or more reference power signatures. A determination of whether a level of similarity between the power signature signal and the one or more reference power signatures meets a threshold condition is made. If so, a determination that the consumer electronic device is in a state associated with the one or more reference power signatures is made. In response to determining that the level of similarity between the power signature signal and the one or more reference power signatures does not meet the threshold condition, a corrective action is performed. In another aspect, a reference power signature is calibrated for a consumer electronic device.

20 Claims, 6 Drawing Sheets

DEVICE STATE DETERMINATION BASED ON POWER SIGNATURES

CROSS-REFERENCE TO RELATED APPLICATIONS

This application claims priority to U.S. Provisional Application No. 63/247,622, filed on Sep. 23, 2021, entitled "State Detection via Power Monitoring," which is incorporated by reference herein in its entirety.

BACKGROUND

The number of devices in a living room is an ever-growing list. Many of these devices are controlled from an infrared (IR) remote. There are also devices that are controlled via RF (radio frequency), IP (Internet Protocol), BT (Bluetooth) and HDMI (High Definition Multimedia Interface), among other control types. As a result, the remotes that the user needs to have to control these devices also grows proportionately to the number of devices he has. In order to simplify the control of all these devices, a home entertainment automation control system is used, which provides the user a single-point control device (such as a handheld remote, a tablet or a computer). While the system eases the uses of the entertainment system, it can cause problems in some scenarios and totally fall apart if the state of the devices is not in sync in which case the user can end up getting frustrated. For example, an HDMI switch connected to a TV/SS (Sound System) that does not have HDMI-CEC (Consumer Electronics Control) will not be able to determine the state of the TV if the TV remote is used to turn it on/off.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are described for the automatic determination of a state of one or more consumer electronic devices via power monitoring. In one aspect, a switching device receives a power signature signal associated with a consumer electronic device. The power signature signal is compared to one or more reference power signatures. A determination of whether a level of similarity between the power signature signal and the one or more reference power signatures meets a threshold condition is made. In response to determining that the level of similarity between the power signature signal and the one or more reference power signatures meets the threshold condition, a determination that the consumer electronic device is in a state associated with the one or more reference power signatures is made. In response to determining that the level of similarity between the power signature signal and the one or more reference power signatures does not meet the threshold condition, a corrective action is performed.

In another aspect, a reference power signature is calibrated for a consumer electronic device. A command is sent to a consumer electronic device to enter a state. A request for confirmation that the consumer electronic device entered the state is sent. In response to receiving, by a switching device, confirmation that the consumer electronic device entered the state, a power signature signal representative of the power consumed by the consumer electronic device in the state is received. The power signature signal is stored as a reference power signature.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
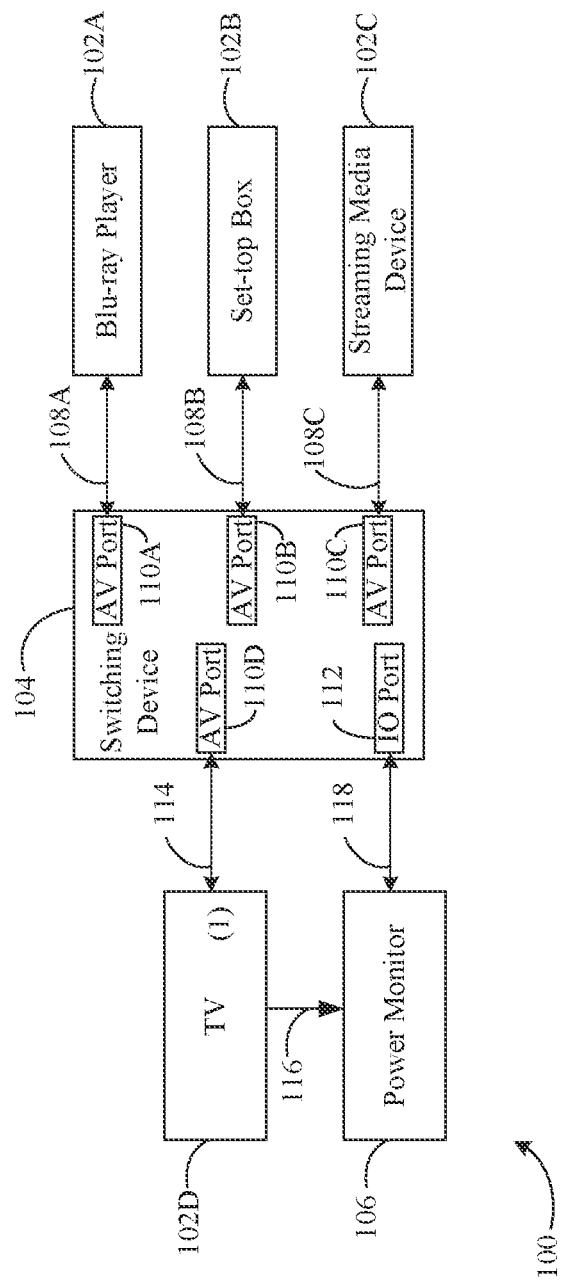
FIG. 1 is a block diagram of a media system configured to automatically determine a state of a consumer electronic device coupled to a switching device, according to an exemplary embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous exemplary embodiments are described herein. Any section/subsection headings provided herein are not intended to be limiting. Embodiments are described throughout this document, and each embodiment may be eligible for inclusion within multiple different sections or subsections. Furthermore, it is contemplated that the disclosed embodiments may be combined with each other in any manner. That is, the embodiments described herein are not mutually exclusive of each other and may be practiced and/or implemented alone, or in any combination.

A method is described herein. The method includes: receiving, in a switching device, a first power signature signal associated with a first consumer electronic device; comparing the first power signature signal to one or more reference power signatures; determining whether a level of similarity between the first power signature signal and the one or more reference power signatures meets a threshold condition; in response to determining that the level of similarity between the first power signature signal and the one or more reference power signatures meets the threshold condition, determining that the first consumer electronic device is in a first state associated with the one or more reference power signatures; and in response to determining that the level of similarity between the first power signature signal and the one or more reference power signatures does not meet the threshold condition, performing a corrective action.

In an implementation of the method the first state comprises: a powered off state, a powered on state, or a standby state.

In an implementation of the method, the method further comprises issuing a command to the first consumer electronic device to enter the first state. Said comparing the first power signature signal to the one or more reference power signatures comprises comparing the first power signature signal to a reference power signature indicative of the first state. Said performing a corrective action comprises: analyzing the first power signature signal and the command to determine at least one of a fault in the first consumer electronic device, a fault in the switching device, or a fault in a remote controller device associated with the first consumer electronic device; and performing the corrective action based on the analysis of the first power signature signal and the command.

In an implementation of the method the command comprises: a first command to power on the first consumer electronic device; a second command to power off the first consumer electronic device; a third command to display video content on the first consumer electronic device; a first operational command associated with the first consumer electronic device; or a second operational command associated with a second consumer electronic device.

In an implementation of the method, the method further comprises, in response to determining that the first consumer electronic device is in the first state, transmitting a command to display a message to the first consumer electronic device.

In an implementation of the method, said performing a corrective action comprises one or more of: sending a request for a second power signature signal associated with the first consumer electronic device; recalibrating a power signature file associated with the first consumer electronic device; reporting an error to a computing device of a service team; reporting an error to a computing device of a user; or reporting an error to the first consumer electronic device.

In an implementation of the method, the method further comprises: sending a command to enter a second state to the first consumer electronic device; sending a request for confirmation that the first consumer electronic device entered the second state; in response to receiving, by the switching device, confirmation that the first consumer electronic device entered the second state, receiving a second power signature signal representative of the power consumed by the first consumer electronic device in the second state; and storing the second power signature signal as a reference power signature of the one or more reference power signatures.

In an implementation of the method, the command to enter the second state includes instructions to display a white screen.

A switching device is described herein. The switching device comprises a plurality of ports and a state identification component. At least one of the plurality of ports communicatively coupled to a consumer electronic device. The state identification component: receives a first power signature signal associated with the consumer electronic device; compares the first power signature signal to one or more reference power signatures; determines that a level of similarity between the first power signature signal and the one or more reference power signatures meets a threshold condition; and in response to determining that the level of similarity between the first power signature signal and the one or more reference power signatures meets the threshold condition, determines that the consumer electronic device is in a first state associated with the one or more reference power signatures.

In an implementation of the switching device, the switching device further comprises an action determination component that, in response to the state identification component determining that the consumer electronic device is in the first state, issues a command to display a message to the consumer electronic device.

In an implementation of the switching device, the state identification component further: receives a second power signature signal associated with the consumer electronic device; compares the second power signature signal to the one or more reference power signatures; and determines that a level of similarity between the second power signature signal and the one or more reference power signatures does not meet the threshold condition. The switching device, in response to the state identification component determining that the level of similarity between the second power signature signal and the one or more reference power signatures does not meet the threshold condition, performs a corrective action.

In an implementation of the switching device, the switching device further comprises an action determination component that issues a command to enter the first state to the consumer electronic device. The one or more reference power signature comprises a reference power signature indicative of the first state. The switching device performs the corrective action by: analyzing the second power signature signal and the command to determine at least one of a fault in the consumer electronic device, a fault in the switching device, or a fault in a remote controller device associated with the consumer electronic device; and performing the corrective action based on the analysis of the second power signature signal and the command.

In an implementation of the switching device, the switching device performs the corrective action by sending a request for a third power signature signal associated with the consumer electronic device.

In an implementation of the switching device, the switching device further comprises a signature calibration component that: sends a command to enter a second state to the consumer electronic device; sends a request for confirmation that the consumer electronic device entered the second state; in response to the switching device receiving confirmation that the consumer electronic device entered the second state, receives a second power signature signal representative of the power consumed by the first consumer electronic device in the second state; and stores the second power signature signal as a reference power signature of the one or more reference power signatures.

A computer-readable storage medium having program instructions recorded thereon that, when executed by a processor circuit perform operations is further described herein. The operations comprise: receiving a first power signature signal associated with the consumer electronic device; comparing the first power signature signal to one or more reference power signatures; determining that the first power signature signal is substantially similar to the one or more reference power signatures; and, in response to said determining that the first power signature signal is substantially similar to the one or more reference power signatures, determining that the consumer electronic device is in a first state associated with the one or more reference power signatures.

In an implementation of the computer-readable storage medium, the operations further comprise, in response to determining that the consumer electronic device is in the first state, transmitting a command to display a message to the consumer electronic device.

In an implementation of the computer-readable storage medium, the operations further comprise: receiving a second power signature signal associated with the consumer electronic device; comparing the second power signature signal to the one or more reference power signatures; determining that a level of similarity between the second power signature signal and the one or more reference power signatures does not meet the threshold condition; and in response to determining that the level of similarity between the second power signature signal and the one or more reference power signatures does not meet the threshold condition, performing a corrective action.

In an implementation of the computer-readable storage medium, the operations further comprise issuing a command to the consumer electronic device to enter the first state. Said comparing the second power signature signal to the one or more reference power signatures comprises comparing the second power signature signal to a reference power signature indicative of the first state. Said performing the corrective action comprises: analyzing the second power signature signal and the command to determine a fault in the consumer electronic device, a fault in the switching device, or a fault in a remote controller device associated with the consumer electronic device; and performing the corrective action based on the analysis of the second power signature signal and the command.

In an implementation of the computer-readable storage medium, performing the corrective action comprises recalibrating a power signature file associated with the consumer electronic device.

In an implementation of the computer-readable storage medium, the operations further comprise: sending a command to enter a second state to the consumer electronic device; sending a request for confirmation that the consumer electronic device entered the second state; in response to receiving confirmation that the consumer electronic device entered the second state, receiving a second power signature signal representative of the power consumed by the consumer electronic device in the second state; and storing the second power signature signal as a reference power signature of the one or more reference power signatures.

II. EXAMPLE EMBODIMENTS

Embodiments are provided for automatically determining the state of a consumer electronic device, such as a television. For instance, in accordance with an embodiment, a power monitor is configured to monitor power consumed by the consumer electronic device. The power consumed by the consumer electronic device is compared to a group of reference power signatures. Each reference power signature is associated with a particular state of the consumer electronic device. If the monitored power consumed is substantially similar to a reference power signature, then a determination is made that the consumer electronic device is in the state associated with the reference power signature. Example states include, but are not limited to, powered off, standby (e.g., a low power state with one or more subsystems powered on, a low power state with a fast wake-up function, etc.), powered on without video (e.g., a black screen), powered on displaying video (e.g., a moving video, a static picture, text messages, a system user experience, etc.), powered on with a particular on-screen display (a mute icon, a volume button, a specific user interface menu of the television or a device coupled to the television (e.g., an application screen, a settings menu, etc.), etc.), powered on displaying particular content (e.g., a particular television series, a particular series episode, a particular video game, a particular movie, etc.), and/or the like.

In many applications, it is crucial to accurately determine the state of the TV. This is useful for reporting the state of the TV, changing the state or confirming a state change after issuing a command. Since TV uses a measurable amount of energy every time there is a change in the color of the pixels fired on the TV, this knowledge could be accurately used to determine the state of or a change in the state of the TV and even the content that is being played on it.

FIG. 1 is a block diagram of a system 100 configured to automatically determine a state of a consumer electronic device, such as a television, in accordance with an example embodiment. As shown in FIG. 1, system 100 includes a switching device 104, a plurality of consumer electronic devices 102A-102D and a power monitor 106. Switching device 104 may be an HDMI-based switching device, but the embodiments disclosed herein are not so limited.

Consumer electronic devices 102A-102C are configured to provide audio and/or video signals (e.g., audio and/or video signals 108A, 108B, and 108C, respectively) for playback and are referred to as "source" devices. Consumer electronic device 102D is configured to receive audio and/or video signals (e.g., audio and/or video signals 114) and is referred to as a "sink" device. Consumer electronic device 102D and switching device 104 are coupled to a power monitor 106. Power monitor 106 is configured to receive power signals (e.g., power signals 116) and provide power signature signals (e.g., power signature signals 118). Power monitor 106 may be incorporated in consumer electronic device 102D, may be incorporated in switching device 104, or may be part of an external power monitoring system that is coupled to consumer electronic device 102D and/or switching device 104. In an embodiment in which power monitor 106 is external to switching device 104 and/or consumer electronic device 102D, power monitor 106 may be communicatively coupled to consumer electronic device 102D and/or switching device 104 via one or more wired interfaces (e.g., an HDMI cable, an optical cable, a universal serial bus (USB) cable, an Ethernet cable, etc.) and/or wireless interfaces (e.g., Bluetooth, Wi-Fi, etc.).

As shown in FIG. 1, consumer electronic device 102A is coupled to a first AV port 110A of switching device 104, consumer electronic device 102B is coupled to a second AV port 110B of switching device 104, consumer electronic device 102C is coupled to a third AV port 110C of switching device 104, consumer electronic device 102D is coupled to a fourth AV port 110D of switching device 104, and power monitor 106 is coupled to an 10 (input/output) port 112 of switching device 104. In accordance with an embodiment, AV ports 110A-110D are HDMI ports and IO port 112 is a USB port. However, embodiments described herein are not so limited. As further shown in FIG. 1, consumer electronic device 102A is a Blu-ray player, consumer electronic device 102B is a set-top box, consumer electronic device 102C is a streaming media device, and consumer electronic device 102D is a TV. Examples of a streaming media device include, but are not limited to, a Roku™ device, an AppleTV™ device, a Chromecast™, and the like. The depiction of these particular electronics devices is merely for illustrative purposes. It is noted that while FIG. 1 shows that switching device 104 includes four AV ports 110A-110D, switching device 104 may include any number of AV ports, and therefore, may be coupled to any number of consumer electronic devices. Further, while FIG. 1 shows that switching device 104 includes one 10 port 112, switching device 104 may include any number of 10 ports, and therefore, may be coupled to any number of power monitors or other devices.

Switching device 104 is configured to select (e.g., switch between) different audio and/or video source devices that are coupled to AV ports 110A-110C (e.g., consumer electronic device 102A, consumer electronic device 102B or consumer electronic device 102C) and provide an output signal (e.g., audio and/or video signals 114) comprising audio and/or video signals (e.g., audio and/or video signals 108A, audio and/or video signals 108B or audio and/or video signals 108C) provided by the selected audio/video source. Audio and/or video signals 114 are provided to consumer electronic device 102D that is coupled to AV port 110D. Audio and/or video signals 114 may also be provided to any other device capable of playing back audio and/or video signals (e.g., speaker(s), secondary displays, etc.) that may be coupled consumer electronic device 102D and/or to AV port 102D and/or other port(s) (not shown) of switching device 104.

Switching device 104 is configured to automatically determine a state of a consumer electronic device coupled thereto (e.g., consumer electronic device 102D). Based on the determined state, switching device 104 may confirm one or more actions have been performed, may report the state of the consumer electronic device, or may perform one or more actions. Such actions include, but are not limited to, automatically switching to the AV port(s) to which such consumer electronic device(s) are connected, transmitting one or more commands to such consumer electronic device(s) (e.g., toggle power on/off commands, operational commands (e.g., play/pause commands, mute commands, etc.)), transmitting a notification message to such consumer electronic device(s), etc.

Figure 2:
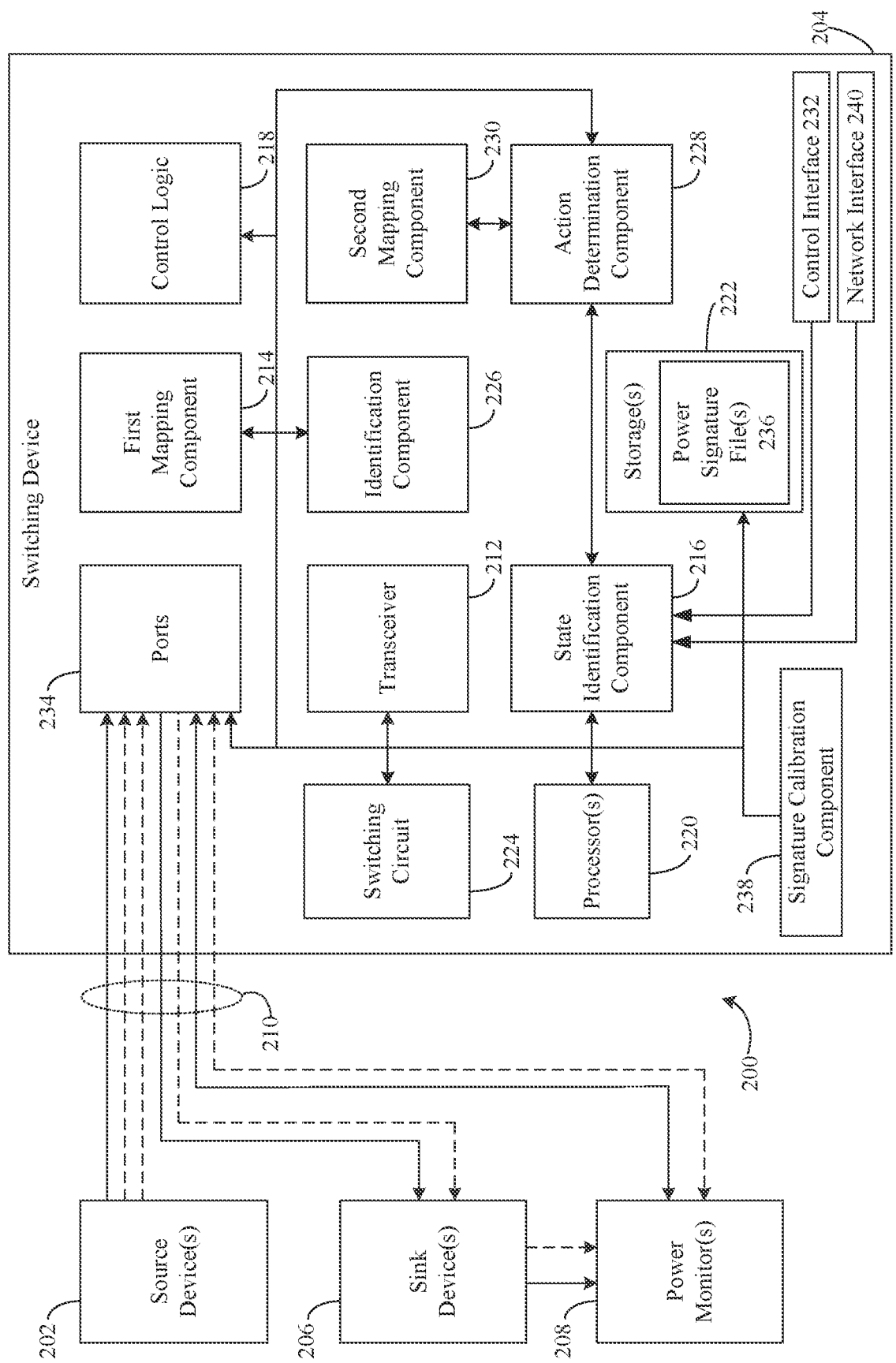
FIG. 2 is a block diagram of a media system configured to automatically determine a state of a consumer electronic device coupled to a switching device, according to another exemplary embodiment.

Turning now to FIG. 2, an exemplary implementation of a system 200 including a switching device 204 is shown in accordance with an example embodiment. Switching device 204 is an example of switching device 104, as described above with reference to FIG. 1. Switching device 204 may include and/or encompass the embodiments described herein. That is, switching device 204 of FIG. 2 is configured to perform methods and/or functions as described in embodiments using components and/or sub-components of the described embodiments. For instance, switching device 204 is configured to automatically determine a state for one or more source devices and/or sink devices coupled thereto via port(s) of switching device 204 and perform actions (e.g., control functions) based on the determined state according to embodiments.

In embodiments, switching device 204 may include some or all of a transceiver 212, a first mapping component 214, a state identification component 216, control logic 218, one or more processors 220, one or more storages 222, a switching circuit 224, an identification component 226, an action determination component 228, a second mapping component 230, a control interface 232, ports 234, a signature calibration component 238 and/or a network interface 240. Switching device 204 may be coupled to one or more source devices 202, one or more sink devices 206, and/or one or more power monitors 208 via connections 210 (e.g., HDMI connections, USB connections, etc.) as would be understood by persons of skill in the relevant art(s) having the benefit of this disclosure. Source device(s) 202 are examples of consumer electronic device(s) 102A-102C, sink device(s) 206 are examples of consumer electronic device 102D, and power monitor(s) 208 are examples of power monitor 106, as respectively described above with reference to FIG. 1. In accordance with an embodiment, power monitor(s) 208 are incorporated as part of switching device 204. In accordance with another embodiment, one or more power monitor(s) 208 are incorporated in one or more devices (e.g., source device(s) 202, sink device(s) 206, etc.) that is external to and communicatively coupled to switching device 204 via either a wired or wireless communication interface, as described herein.

Ports 234 may include one or more AV ports and/or 10 ports as described herein, although the embodiments described herein are not so limited. Ports 234 may be HDMI ports and/or USB ports as described herein, although the embodiments described herein are not so limited. Storage(s) 222 may be one or more of any storage device described herein, such as, but not limited to, those described below with respect to FIG. 6. As shown in FIG. 2, storage(s) 222 includes one or more power signature files 236. Processor(s) 220 may be one or more of any processing device or processor described herein, such as, but not limited to, those described below with respect to FIG. 6, and may be configured as described elsewhere herein.

Transceiver 212 is configured to receive and transmit wired and/or wireless data according to any protocol and/or embodiment described herein, such as HDMI in HDMI switch embodiments. For instance, transceiver 212 is configured to receive and to transmit audio/video signals according to HDMI protocols from HDMI sources and HDMI sinks respectively.

Identification component 226 may be implemented as hardware (e.g., electrical circuits), or hardware that executes one or both of software (e.g., as executed by a processor or processing device) and firmware. Identification component 226 is configured to operate and perform functions according to the embodiments described herein. For example, identification component 226 may be configured to identify the consumer electronic device (e.g., source device(s) 202 or sink device(s) 206) coupled to each AV port of ports 234 and/or to identify the power monitor (e.g., power monitor(s) 208) coupled to each IO port of ports 234. For example, for each source device(s) 202 and/or sink device(s) 206, identification component 226 may be configured to determine identifier(s) thereof, such as, but not limited to a type of the device (e.g., a DVD player, a Blu-ray player, a video game console, a streaming media device, a TV, an HDTV, a projector, etc.), a brand name of the device, a manufacturer of the device, a model number of the device, etc. Further, for each power monitor(s) 208, identification component 226 may be configured to determine identifier(s) thereof, such as, but not limited to a type of device, a brand name of the device, a manufacturer of the device, a model number of the device, an associated consumer electronic device (e.g., source device(s) 202 or sink device(s) 206), etc. The identifier(s) may be determined according to various techniques, such as, but not limited to: techniques based on HDMI consumer electronics control (CEC), identification via video data, identification via audio data, identification via IP network, remote control operation by a user, voice input from a user, and explicit device selection by a user. Identification component 226 outputs the identifier(s), which is/are received by first mapping component 214.

First mapping component 214 may be implemented as hardware (e.g., electrical circuits), or hardware that executes one or both of software (e.g., as executed by a processor or processing device) and firmware. First mapping component 214 is configured to operate and perform functions according to the embodiments described herein. First mapping component 214 is configured to determine a device-to-port mapping based on the identifier(s) received from identification component 226. For example, first mapping component 214 may generate a data structure (e.g., a table, a map, an array, etc.) that associates the identifier(s) for any given identified device to the port to which that electronic device is coupled. In this way, the device-to-port mapping may indicate that a first source device (e.g., a Blu-ray player) is coupled to a first AV port (e.g., AV Port 1), that a second source device (e.g., a set-top box) is coupled to a second AV port (e.g., AV Port 2), that a third sink device (e.g., a TV) is coupled to a third AV port (e.g., AV Port 3), and that a first power monitor is coupled to a first TO port (e.g., TO Port 1). Further, the data structure generated by first mapping component 214 may indicate which electronic device is associated with a power monitor. For example, the device-to-port mapping may indicate that the third sink device coupled to the third AV port is associated with (e.g., coupled to) the first power monitor coupled to the first TO port.

Control logic 218 receives the mapping generated by first mapping component 214 and optionally receives the identifiers generated by identification component 226. Based at least in part on the identifiers and mappings, control logic 218 is configured to generate a control signal that is received by switching circuit 224 and/or transceiver 212, and configured to cause switching circuit 224 to connect the identified source device(s) 202 and/or sink device(s) 206 on AV port(s) of ports 234 to corresponding receiver portions or transmitter portions of transceiver 212 and/or causing transceiver 212 to output desired content received from source device(s) 202 on a specified output AV port of ports 234.

Switching circuit 224 may be implemented as hardware (e.g., electrical circuits), or hardware that executes one or both of software (e.g., as executed by a processor or processing device) and firmware. Switching circuit 224 is configured to operate and perform functions according to the embodiments described herein. For example, switching circuit 224 is configured to provide switched connections between ports 234 and transceiver 212. That is, switching circuit 224 may provide a connection between any port of ports 234 and any receiver component or transmitter component of transceiver 212. Switching circuit 224 may comprise one or more switch circuit portions (e.g., comprising one or more switches/switching elements) and may be combined or used in conjunction with other portions of system 200.

Control interface 232 may comprise a receiver configured to receive wireless control signals from a device, such as a remote control device, a computing device configured to control switching device 204, source device(s) 202, and/or sink device(s) 206. Control interface 232 may be configured to receive, detect, and/or sniff wireless control signals from a plurality of different remote control devices, for example, a dedicated control device configured to control switching device 204, or dedicated control devices each configured to control a respective device of source device(s) 202 or sink device(s) 206. For instance, control interface 232 may comprise a wireless receiver configured to receive control signals transmitted from a remote control device via an IR, an RF-based protocol, and/or an IP-based protocol. Upon detecting control signals, control interface 232 analyzes the control signals to identify one or more identifier(s) therein that uniquely identify the consumer electronic device for which the control signals are intended (e.g., source device(s) 202 and/or sink device(s) 206). Control interface 232 may further determine a command (e.g., a toggle power-on/power-off command, play, fast-forward, pause, rewind, etc.) included in the control signals. The identifier(s) and/or command(s) may be provided to signature calibration component 238 and/or state identification component 216, as described further below.

Signature calibration component 238 may be implemented as hardware (e.g., electrical circuits), or hardware that executes one or both of software (e.g., as executed by a processor or processing device) and firmware. Signature calibration component 238 is configured to operate and perform functions according to the embodiments described herein. For example, signature calibration component 238 may be configured to determine and store values for different power signatures. The values may be stored via one or more power signature files 236. For instance, signature calibration component 238 may be configured to store power signatures associated with states of sink device(s) 206 via signals received from power monitor(s) 208. Signature calibration component 238 may calibrate power signature files 236 for determining a state of a consumer electronic device responsive to receiving a calibration command (e.g., from control interface 232).

After receiving a calibration command, signature calibration component 238 may request a consumer electronic device (e.g., source device(s) 202 and/or sink device(s) 206) to enter a state. For example, and without limitation, signature calibration component 238 may issue a toggle command to source device(s) 202 and/or sink device(s) 206 to toggle power (i.e., to turn it off or on), issue an operational command to source device(s) 202 and/or sink device(s) 206, such as "play" or "pause", transmit a notification message to source device(s) 202 and/or sink device(s) 206, and/or automatically cause switching device 204 to switch to port(s) of ports 234 to which a particular source device of source device(s) 202 and/or a particular sink device of sink device(s) 206 are coupled. In accordance with an embodiment, the commands are provided to the consumer electronic device via a port of ports 234 to which the consumer electronic device is coupled. In accordance with another embodiment, the commands are provided to the consumer electronic device via a wireless protocol (e.g., Bluetooth™, ZigBee®, NFC, IEEE 802.11-based protocols, etc.). In accordance with an embodiment, the commands are provided to the consumer electronic device via control interface 232 to which the consumer electronic device is coupled. In accordance with an embodiment, the commands are provided to the consumer electronic device via network interface 240 to which the consumer electronic device is coupled. In accordance with an alternative embodiment, signature calibration component 238 provides instructions to action determination component 228 to issue the commands (e.g., on behalf of signature calibration component 238).

Signature calibration component 238 may receive confirmation that the consumer electronic device entered the requested state. In accordance with an embodiment, a user provides a confirmation signal to signature calibration component 238 in response to the consumer electronic device entering the requested state. For example, a user may provide the confirmation signal via an input device (e.g., a remote control, a mobile phone, etc.) or a button on a device (e.g., a button on source device(s) 202, switching device 204, sink device(s) 206, power monitor(s) 208, etc.). In accordance with an embodiment, a request for confirmation is displayed on one or more of sink device(s) 206 (e.g., a television) and/or received as a notification (e.g., a text message, an app notification, an e-mail message, a web app notification, etc.) on a device (e.g., a mobile phone, a tablet, a computer device, a remote control, source device(s) 202, switching device 204, sink device(s) 206, power monitor(s) 208, etc.). In accordance with an embodiment, the confirmation signal is received by control interface 232. In accordance with an embodiment, the confirmation signal is received by network interface 240. Once the confirmation input is received, signature calibration component 238 receives a power signature signal from a power monitor (e.g., power monitor(s) 208).

The power monitor (e.g., power monitor(s) 208) is configured to provide a power signature signal. For instance, power monitor(s) 208 may receive one or more power signals from sink device(s) 206 and provide one or more power signature signals to switching device 204 (e.g., via a port of ports 234 to which power monitor(s) 208 is coupled, via control interface 232 to which power monitor(s) 208 is coupled, or via network interface 240 to which power monitor(s) 208 is coupled).

As part of the calibration process, the power signature signal is provided to signature calibration component 238. Signature calibration component 238 is configured to store the power signature signal as a reference power signature associated with the consumer electronic device operating in the state. The reference power signature may be stored as one of power signature file(s) 236. Reference power signatures may be stored as a dataset (e.g., a graph, a table, an array, etc.). Power signature file(s) 236 may be used by state identification component 216.

State identification component 216 may be implemented as hardware (e.g., electrical circuits), or hardware that executes one or both of software (e.g., as executed by a processor or processing device) and firmware. State identification component 216 is configured to operate and perform functions according to the embodiments described herein. For example, state identification component 216 may be configured to determine a state with respect to consumer electronic device(s) communicatively coupled to switching device 204. For instance, in accordance with an embodiment, state identification component 216 is configured to determine a state of sink device(s) 206 via signals received from power monitor(s) 208. State identification component 216 may determine a state of a consumer electronic device responsive to detecting a triggering event. Examples of triggering events are described further below.

After detecting a triggering event, state identification component 216 may request a reading from the power monitor (e.g., power monitor(s) 208) representative of the power consumed by a respective consumer electronic device (e.g., sink device(s) 206). For instance, state identification component 216 may provide a power signature request signal to the power monitor. In accordance with an embodiment, the power signature request signal is provided to the power monitor via a port of ports 234 to which the power monitor is coupled. In accordance with another embodiment, the power signature request signal is provided to the consumer electronic device via a wireless protocol (e.g., Bluetooth™ ZigBee®, NFC, IEEE 802.11-based protocols, etc.). In accordance with an embodiment, the power signature request signal is provided to the power monitor via control interface 232 to which the power monitor is coupled. In accordance with an embodiment the power signature request signal is provided to the power monitor via network interface 240 to which the power monitor is coupled. In accordance with an embodiment, the power signature request signal includes an indicator indicating a particular consumer electronic device (e.g., a television). For instance, the power signature request signal may include an indicator associated with a consumer electronic device (e.g., sink device(s) 206) coupled to an AV port of ports 234. In accordance with an alternative embodiment, state identification component 216 continuously or periodically receives power signature signals from the power monitor instead of, or in addition to, sending a power signature request signal.

Power monitor(s) 208 are configured to provide a power signature signal. For instance, power monitor(s) 208 may receive one or more power signals from respective sink device(s) 206 and provide one or more power signature signals. In accordance with an embodiment, power monitor(s) 208 provides one or more power signature signals in response to a power signature request signal, on a periodic basis, or on a continuous basis.

The power signature signal is provided to state identification component 216. State identification component 216 is configured to perform a cross correlation of the power signature signal provided by the power monitor (e.g., power monitor(s) 208) with one or more reference power signatures stored in power signature file(s) 236. In accordance with an embodiment, the power signature signal and the reference power signatures are power or current levels measured over a time window. As a non-limiting example, a power signature signal may represent current drawn by the consumer electronic device over a 30 second window. In embodiments, time windows may be of various magnitudes (e.g., one or more milliseconds, seconds, minutes, etc.). In accordance with an embodiment, power signatures are analyzed as datasets (e.g., graphs, tables, arrays, etc.).

Therefore, cross correlation can be used to determine whether the power signature signal is at least substantially similar or not to one or more reference power signatures. Ideally, the maximum normalized correlation between two signals will be 1. However, the power signature signal provided by the power monitor may be influenced by electrical noise, device efficiency, device age, cable efficiency, and other factors. In this scenario the maximum correlation will not be 1. Hence, a threshold condition is estimated through experiment, within which the power signature signal and a reference power signature are assumed to be slightly correlated (i.e., a level of similarity between the power signature signal and the reference power signature meets the threshold condition). In order to have some room for accepting an imperfect environment, a threshold deviation window is utilized in certain embodiments. For example, a threshold deviation window may be a predetermined range of values above and/or below the values stored in the reference power signature. For instance, if a reference power signature is represented by a curve of current measured in milliamperes (mA), the threshold deviation window may cover value(s) above and/or below value(s) on the curve that deviate by a maximum amount (e.g., 5 mA). In a non-limiting example, a power signature signal is represented as a curve of current measured over a thirty second window. In this context, the value(s) on the curve may fall within a threshold deviation window of a reference power signature, indicating that a level of similarity between the power signature signal and the reference power signature meet a threshold condition (e.g., are substantially similar to each other).

If a level of similarity between the power signature signal and a reference power signature meets a threshold condition (e.g., the power signature signal is within a threshold deviation window for a reference power signature), then state identification component 216 determines that the consumer electronic device associated with the power signature signal is in the state associated with the reference power signature. If the level of similarity does not meet the threshold condition (e.g., the power signature signal is not within the threshold deviation window), then state identification component 216 determines that the consumer electronic device is not in the state associated with the reference power signature. In this case, state identification component 216 may compare the power signature signal with a different reference power signature. In accordance with an embodiment, if no matches are found, state identification component 216 requests a corrective action. Example corrective actions are described further below.

In accordance with an embodiment, the power signature signal is assigned a correlation score. For example, the power signature signal may be scored with respect to a reference power signature based on how similar they are. In this context, the assigned correlation score represents a level of similarity between the power signature signal and the reference power signature. State identification component 216 may determine the power signature signal matches a particular reference power signature if a correlation score meets or exceeds a correlation threshold (e.g., the level of similarity between the power signature signal and the reference power signature meets a threshold condition). In a non-limiting example, one or more values on a power curve of the power signature signal are compared with one or more values on a power curve of the reference power signature. In this context, each value on the power curve of the power signature signal is given a sub-score based on how close it is to the respective value on the power curve of the reference power signature. Sub-scores may be combined (e.g., summed, averaged, etc.) to determine a correlation score for the power signature signal. If the correlation score exceeds a correlation threshold, state identification component 216 determines the power signature signal meets a threshold condition for the reference power signature and matches the power signature signal to the reference power signature (e.g., determines that the consumer electronic device is in a state corresponding to the reference power signature, as described elsewhere herein). Otherwise, state identification component 216 may compare the power signature signal to another reference power signature or request a corrective action.

In some embodiments, for the identification process, state identification component 216 processes the received power signature signals in segments smaller than the one or more reference power signatures. This may help to quickly identify states with steady or unique power signatures. For instance, states such as powered off or standby states may be associated with substantially constant power signatures (e.g., power signatures that have a constant average power level over time, power signatures with power levels that remain within a threshold range over time, and/or the like). If a segment of the received power signature signal matches a portion of a reference power signature that is unique from other reference power signatures, further processing may not be required. As a non-limiting example, the powered-off state of a television consumes near 0 W or 0 W and no other state consumes near 0 W for more than a predetermined threshold time. In this context, if a segment of the received power signature signal indicates that near 0 W or 0 W are consumed for at least the predetermined threshold time, the state identification component 216 determines the television is in the powered-off state.

Action determination component 228 may be implemented as hardware (e.g., electrical circuits), or hardware that executes one or both of software (e.g., as executed by a processor or processing device) and firmware. Action determination component 228 is configured to operate and perform functions according to the embodiments described herein. For example, action determination component 228 may be configured to, based on the state, perform at least one action with respect to a particular consumer electronic device. For example, and without limitation, action determination component 228 may issue a toggle command to source device(s) 202 and/or sink device(s) 206 to toggle power (i.e., to turn it off or on), issue an operational command to source device(s) 202 and/or sink device(s) 206, such as "play" or "pause", transmit a notification message to source device(s) 202 and/or sink device(s) 206, and/or automatically cause switching device 204 to switch to port(s) of ports 234 to which a particular source device of source device(s) 202 and/or a particular sink device of sink device(s) 206 are connected. Action determination component 228 may determine the action(s) to be performed using second mapping component 230.

Second mapping component 230 may be implemented as hardware (e.g., electrical circuits), or hardware that executes one or both of software (e.g., as executed by a processor or processing device) and firmware. Second mapping component 230 is configured to operate and perform functions according to the embodiments described herein. Second mapping component 230 is configured to maintain a state-to-action mapping that specifies action(s) that are to be performed by switching device 204 based on the state for a particular device. Second mapping component 230 may maintain a state-to-action mapping for each of source device(s) 202 and/or sink device(s) 206. Each state-to-action mapping may comprise a data structure (e.g., a table) that associates the action(s) to take for any given state. Action determination component 228 may reference second mapping component 230 to determine the action(s) to be performed in response to detecting a triggering event. In accordance with an example embodiment, action determination component 228 may reference second mapping component 230 to determine the action(s) to be performed as part of the calibration process as described with respect to signature calibration component 238 above.

One non-limiting example of a triggering event is determining that a user has performed an action intended to cause any or all of source device(s) 202 and/or sink device(s) 206 to transition to a desired state. One such action may be providing a command (e.g., via interacting with a particular interface element (e.g., a button or selectable icon) (or the like) of a remote control device or via a voice command) that is configured to power on or off particular source device(s) 202 and/or sink device(s) 206. For instance, a user may interact with a "Watch DVD" interface element on a remote control device or speak the words "Watch DVD" in a microphone included in the remote control device and/or switching device 204 (not shown). Control interface 232 may detect the command and cause state identification component 216 to determine the state of consumer electronic device(s) coupled to switching device 204 (such as sink device(s) 206).

Another example of a triggering event is receiving a command via network interface 240. Network interface 240 is configured to interface with remote sites or one or more networks and/or devices via wired or wireless connections. Examples of networks include, but are not limited to, local area networks (LANs), wide area networks (WANs), the Internet, etc. In a particular example, suppose a user remotely-located from system 200 (e.g., in another house, building, etc.) would send a notification (e.g., an emergency notification ("Severe Thunderstorm Warning," "There's a fire in the building, evacuate immediately," etc.), a notification to provide a reminder, a notification to initiate a video call, etc.) to be displayed on sink device(s) 206 with the intent of the user of sink device(s) 206 reading the notification. If sink device(s) 206 are powered off, the notification will never be displayed.

The determined state and/or detected command may be provided to action determination component 228, which provides the state and/or command to second mapping component 230. Second mapping component 230 provides the action(s) to be performed based on the state and/or the detected command. For instance, second mapping component 230 may associate various commands to the state-to-action mapping to determine which action should be taken based on the command received and the state of a sink device(s) 206. For example, suppose the command received is a "Watch DVD" command, and the determined state of a TV indicates that the TV is powered-off. The state-to-action mapping may specify that switching device 204 is to send a toggle command to the TV that causes the TV to power itself on. If the state for the TV indicates that the TV is powered-on, the state-to-action mapping may specify that no action is to be taken with respect to the TV (since the toggle command would result in the TV turning off). In each of the examples, the state-to-action mapping may further specify that switching device 204 is to automatically switch to the port of ports 234 to which the DVD player is coupled. Switching device 204 may utilize the device-to-port mapping of first mapping component 214 to determine the respective ports to which the TV and the DVD player are coupled.

Another non-limiting example of a triggering event is confirming that an action was performed correctly. For instance, once actions provided by second mapping component 230 and issued by action determination component 228 are performed, state identification component 216 may compare power signature signals of consumer electronic devices (e.g., source device(s) 202 and/or sink device(s) 206) to determine if the action was performed correctly. For example, suppose the command received was to turn on a TV, state identification component 216 may compare a power signature signal associated with the TV with a reference power signature associated with the TV in a powered-on state to determine if the TV was turned on. Moreover, embodiments of state identification component 216 may compare power signature signals to reference power signatures to confirm other commands were performed correctly, including commands such as, but not limited to, turning off the TV, launching an app (e.g., an app of the TV, an app of another consumer electronic device (e.g., source device(s) 202 and/or sink device(s) 206), etc.), switching a source device, starting content (e.g., a movie, a videogame, a television series, a series episode, etc.), going to a home screen, executing a command macro. In accordance with an embodiment, state identification component 216 compares power signature signals to reference power signatures in response to the TV turning on in order to determine which source device (e.g., source device(s) 202) is active (e.g., displaying content on the TV).

Further, power signature signals may be analyzed to determine a particular powered-on state of a consumer electronic device. For example, power signature signals of a powered-on TV may be analyzed to determine if there is no video displayed (e.g., a black screen), a video displayed (e.g., a moving video, a static picture, text messages, a system user experience, etc.), a particular on-screen icon/menu display (a mute icon, a volume button, a specific television user interface menu), a particular content displayed (e.g., a television series, a series episode, a videogame, a movie, etc.), and/or the like.

As stated previously, if a power signature signal does not match any reference power signature, state identification component 216 may request a corrective action. Corrective actions may include, but are not limited to, sending a request for a new power signature signal, analyzing a new power signature signal, recalibrating via signature calibration component, reporting an error to a service team (e.g., via a wireless connection (e.g., via network interface 240), e-mail, text message, etc.), reporting an error to a user (e.g., via sink device(s) 206, source device(s) 202, switching device 204, power monitor(s) 208, network interface 240, an e-mail, an app notification, a text message, etc.), and/or sending a command to the consumer electronic device to enter a state. In accordance with an embodiment, switching device 204 performs and/or requests multiple corrective actions simultaneously or sequentially. For example, switching device 204 may first request and analyze a new power signature signal. If the new power signature signal does not match any reference power signature, switching device 204 may recalibrate power signature file(s) 236. Once calibrated, an updated new power signature signal is analyzed. If the updated new power signature signal does not match any reference power signature, an error is reported to the user and/or a service team.

As stated above, an example of a corrective action includes reporting an error to a user (e.g., via sink device(s) 206, source device(s) 202, switching device 204, power monitor(s) 208, network interface 240, an e-mail, an app notification, a text message, etc.). For instance, a switching device 204 may report an error to a user indicating that a command was not processed correctly (e.g., due to a failure of the consumer electronic device, switching device 204, and/or a remote controller device associated with the consumer electronic device). Additional details regarding reporting errors to a user will be discussed further below with respect to FIG. 4C.

Figure 3:
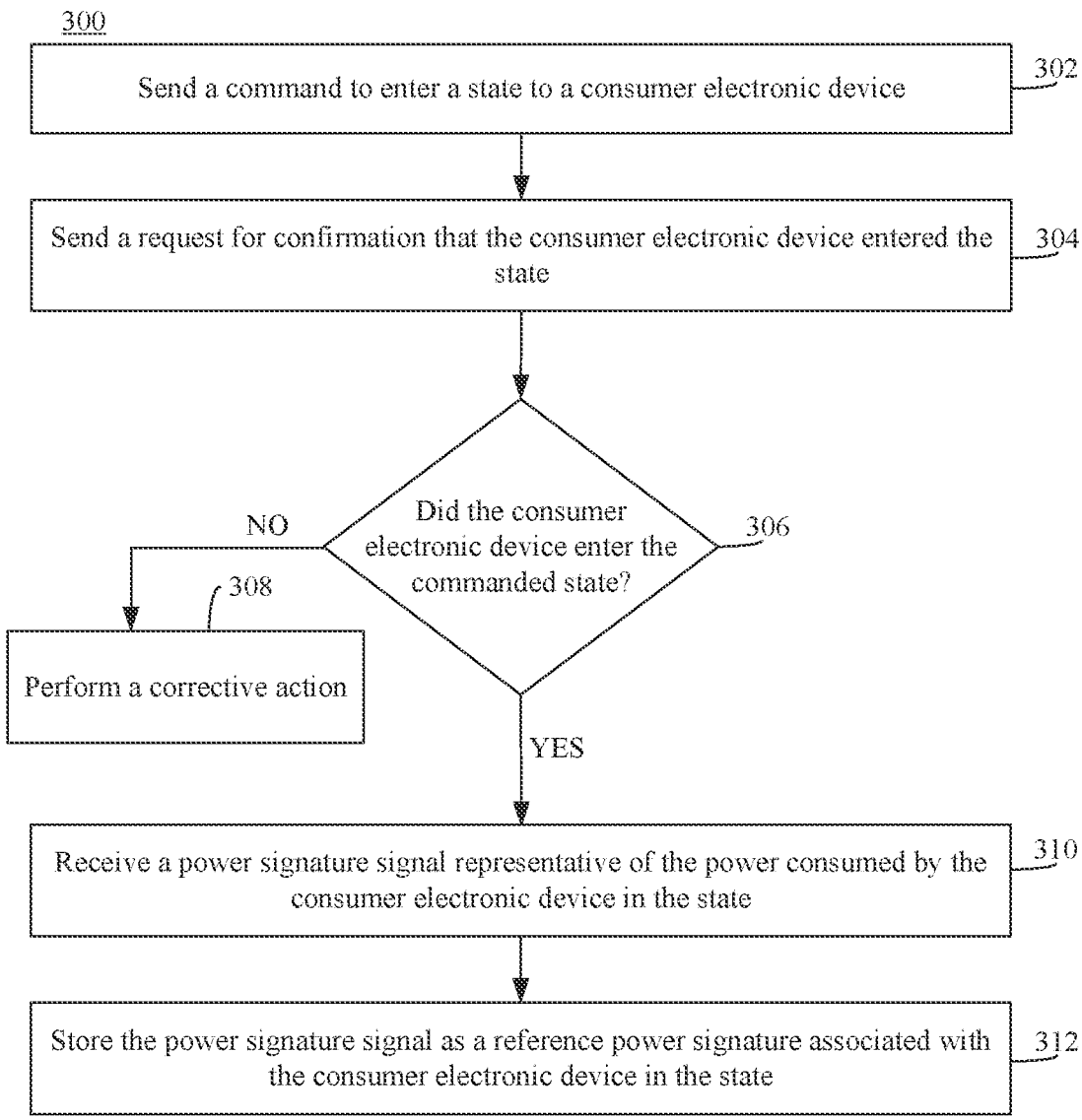
FIG. 3 is a flowchart of a process for calibrating a switching device to determine a state for a consumer electronic device, according to an exemplary embodiment.

Accordingly, in embodiments, switching device 204 may be calibrated for determining a state for a consumer electronic device in many ways. For instance, FIG. 3 depicts a flowchart 300 for calibrating a switching device to determine a state of a consumer electronic device in accordance with an embodiment. The method of flowchart 300 may be implemented by system 200 as described above in reference to FIG. 2. Accordingly, flowchart 300 will be described with continued reference to FIG. 2. Other structural and operational embodiments will be apparent to persons skilled in the relevant art(s) based on the following discussion regarding flowchart 300 and system 200.

Flowchart 300 begins with step 302. At step 302, a command is sent to a consumer electronic device to enter a state. For example, with reference to FIG. 2, switching device 204 transmits a command to sink device(s) 206.

At step 304, a request for confirmation that the consumer electronic device entered the state is sent. For example, with reference to FIG. 2, signature calibration component 238 prompts a user to confirm whether or not the consumer electronic device entered the state (e.g., transmitting a signal to sink device(s) 206 and/or source device(s) 202 (e.g., via a port of ports 234 by which sink device(s) 206 and/or source device(s) 202 are communicatively coupled to switching device 204, via control interface 232 by which sink device(s) 206 and/or source device(s) 202 are communicatively coupled to switching device 204, and/or via network interface 240 by which sink device(s) 206 and/or source device(s) 202 are communicatively coupled to switching device 204) to display a message to the user, transmitting ("pushing") a notification to a device (e.g., a cellular phone, a tablet, a computer, sink device(s) 206, source device(s) 204, etc.) to alert the user, and/or the like).

At step 306, a determination is made as to whether the consumer electronic device entered the commanded state. If a determination is made that the consumer electronic device did enter the commanded state, then flow continues to step 310. Otherwise, flow continues to step 308. For example, with reference to FIG. 2, a user provides a confirmation signal indicating whether the consumer electronic device entered the commanded state.

At step 308, in response to a determination that the consumer electronic device did not enter the commanded state, a corrective action is performed. For example, signature calibration component 238 may resend the command to the consumer electronic device (e.g., the process restarts at step 302). In accordance with an embodiment, if the consumer electronic device does not enter the commanded state after multiple attempts, switching device 204 transmits an error message to sink device(s) 206 and/or source device(s) 202 (e.g., via a port of ports 234 by which sink device(s) 206 and/or source device(s) 202 are communicatively coupled to switching device 204, via control interface 232 by which sink device(s) 206 and/or source device(s) 202 are communicatively coupled to switching device 204, and/or via network interface 240 by which sink device(s) 206 and/or source device(s) 202 are communicatively coupled to switching device 204). In accordance with an embodiment, if the consumer electronic device does not enter the commanded state after multiple attempts, switching device 204 transmits an error message to an external device (e.g., to a mobile phone, computer, or tablet) (e.g., as an e-mail, a text message, an app notification, etc.). In accordance with an alternative embodiment, signature calibration component 238 performs a corrective action other than (or in addition to) resending the command to the consumer electronic device, as described elsewhere herein.

At step 310, in response to a determination that the consumer electronic device did enter the commanded state, a power signature signal is received. The power signature signal represents the power consumed by the consumer electronic device in the state. For example, with reference to FIG. 2, power monitor(s) 208 provide signature calibration component 238 with one or more power signature signals representative of the power consumed by respective sink device(s) 206 and/or source device(s) 202.

At step 312, the power signature signal received in step 310 is stored as a reference power signature associated with the consumer electronic device operating in the commanded state. For example, with reference to FIG. 2, signature calibration component 238 may store received power signature signals from power monitor(s) 208 as reference power signatures in power signature file(s) 236 of storage(s) 222.

As discussed above with reference to FIG. 3, signature calibration component 238 may send a request for confirmation that the consumer electronic device entered a state and subsequently receive confirmation that the consumer electronic device did enter the state or an indication that the consumer electronic device did not enter the state. It is also contemplated herein that signature calibration component 238 may automatically confirm whether or not the consumer electronic device entered the state. For example, signature calibration component 238 may include, in the command sent in step 302, instructions for the consumer electronic device to enter a state represented by a reference power signature stored in power signature file(s) 236 of storage(s) 222 or otherwise recognized by signature calibration component 238. For instance, signature calibration component 238 may send the command in step 302 with instructions to display a white screen prior to entering the state. In this context, signature calibration component 238 receives the power signature signal representative of the power consumed by the consumer electronic device displaying the white screen and subsequently entering the state. Signature calibration component 238 automatically determines whether or not the consumer electronic device displayed the white screen by comparing the received power signature signal with a reference power signature representative of the power consumed by the consumer electronic device while displaying a white screen (as described elsewhere herein). If the received power signature signal does include a portion matching the reference power signature, signature calibration component 238 stores at least the portion of the power signature signal representative of the consumer electronic device subsequently entering the state (e.g., the process proceeds to step 312 of flowchart 300). Otherwise, signature calibration component 238 performs a corrective action (e.g., the process proceeds to step 308 of flowchart 300).

Figure 4A:
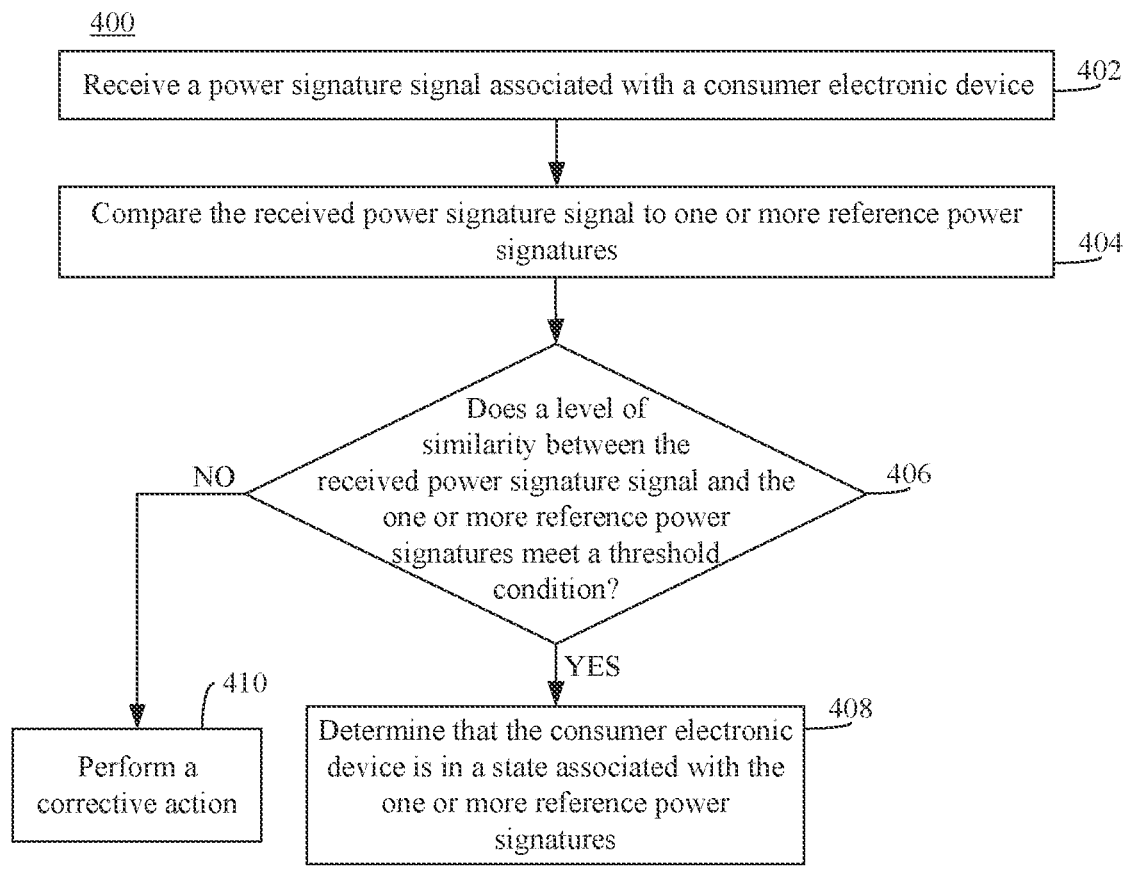
FIG. 4A is a flowchart of a process for determining a state for a consumer electronic device, according to an exemplary embodiment.

As discussed above, state identification component 216 may determine a state of a consumer electronic device (e.g., one or more source device(s) 202 and/or one or more sink device(s) 206) in various ways. For example, FIG. 4A depicts a flowchart 400 for determining a state of a consumer electronic device in accordance with an embodiment. The method of flowchart 400 may be implemented by system 200 as described above in reference to FIG. 2. Accordingly, flowchart 400 will be described with continued reference to system 200. Other structural and operational embodiments will be apparent to persons skilled in the relevant art(s) based on the following discussion regarding flowchart 400 and system 200.

Flowchart 400 begins with step 402. At step 402, a power signature signal associated with a consumer electronic device is received. For example, with reference to FIG. 2, switching device 204 receives a power signature signal associated with sink device(s) 206 from power monitor(s) 208.

At step 404, the received power signature signal is compared to one or more reference power signatures. For example, with reference to FIG. 2, state identification component 216 compares the power signature signal provided by power monitor(s) 208 to one or more reference power signatures stored in power signature file(s) 236.

At step 406, a determination is made as to whether a level of similarity between the received power signature signal and the one or more reference power signatures meets a threshold condition. If a determination is made that the level of similarity between the received power signature signal and the one or more reference power signatures meets the threshold condition, then flowchart 400 continues to step 408. Otherwise, flowchart 400 continues to step 410. For example, with reference to FIG. 2, state identification component 216 determines whether a level of similarity between the received power signature signal and the one or more reference power signatures. meets a threshold condition. As discussed above with respect to FIG. 2, state identification component 216 may determine a level of similarity between the received power signature signal and the one or more reference power signature by comparing value(s) on a curve of the power signature signal to value(s) on a curve of a reference power signature. In this context, a level of similarity is determined based on the number of value(s) on the received power signature signal that fall within a threshold deviation window (e.g., a predetermined range of values) for respective value(s) on the curve of the reference power signature and/or how individual value(s) on the curve of the power signature signal compare to respective value(s) on a curve of the reference power signature (e.g., how close or far an individual value is compared to the respective value on a curve of the reference power signature). State identification component 216 assigns a correlation score to the received power signature signal based on the level of similarity and compares the assigned correlation score to a correlation threshold. If the correlation score meets or exceeds the correlation threshold, flowchart 400 proceeds to step 408. Otherwise, flowchart 400 proceeds to step 410.

In embodiments, step 404 may include comparing the received power signature signal to a plurality of reference power signatures. For instance, state identification component 216 may compare the received power signature signal to a plurality of reference power signatures corresponding to the same state (e.g., an expected state) and/or a plurality of reference power signatures corresponding to respective states. In this context, step 404 includes comparing the power signature signal to each of the plurality of reference power signatures and step 406 includes determining whether respective levels of similarities between the received power signature signal and each respective reference power signature meets the threshold condition. Alternatively, steps 404 and 406 include (e.g., sequentially) comparing the power signature signal to one of the reference power signatures and determining whether a level of similarity between the received power signature signal and the one of the reference power signatures meets the threshold condition. In this case, if a level of similarity between the received power signature signal and the one of the reference power signatures meets the threshold condition, flowchart 400 proceeds to step 408 (e.g., without state identification component 216 comparing the power signature signal to the remaining reference power signatures). In accordance with an embodiment where state identification component compares the received power signature signal to a plurality of reference power signatures corresponding to the same state, step 406 may include determining whether a predetermined number of levels of similarity between the reference power signatures and respective ones of the plurality of reference power signatures meet the threshold condition (e.g., at least one level of similarity meets the threshold condition, a minimum percentage of levels of similarity meet the threshold condition, etc.). In this context, if a predetermined number of levels of similarity do meet the threshold condition, flowchart 400 proceeds to step 408. Otherwise, flowchart 400 proceeds to step 410.

At step 408, a determination is made that the consumer electronic device is in a state associated with the one or more reference power signature. For example, with reference to FIG. 2, state identification component 216 determines that sink device(s) 206 are in a state associated with the one or more reference power signatures corresponding to the level of similarity determined in step 406.

At step 410, a corrective action is performed. For example, with reference to FIG. 2, state identification component 216 determines the level of similarity between the received power signature signal and the one or more reference power signals do not meet the threshold condition and requests one or more corrective actions to be performed.

In embodiments, system 200 may perform various actions in response to determining that a consumer electronic device is in a state associated with one or more reference power signatures. For example, system 200 may perform one or more steps of flowchart 400 in response to receiving a command for the consumer electronic device to enter a requested state. In response to the command, system 200 requests a power signature signal of the consumer electronic device (e.g., from power monitor 208 of FIG. 2). System 200 performs steps of flowchart 400 to determine the current state of the consumer electronic device. If the current state of the consumer electronic device does not match the request state of the consumer electronic device, action determination component 228 issues a command to the consumer electronic device to enter the requested state, as described elsewhere herein. Otherwise, system 200 either performs no action or notifies the requesting user (e.g., via the consumer electronic device, one of sink devices 202, a text message, an app notification, an e-mail message, as a web app notification, etc.) that consumer electronic device is already in the requested state.

Figure 4B:
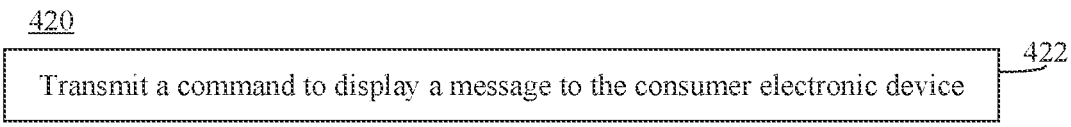
FIG. 4B is a flowchart of a process for transmitting a command to a consumer electronic device in response to determining that the consumer electronic device is in a state associated with one or more reference power signatures, according to an exemplary embodiment.

In accordance with another embodiment, in response to determining that a consumer electronic device is in a state associated with one or more reference power signatures, system 200 may notify a user associated with the consumer electronic device (e.g., via the consumer electronic device, a text message, an app notification, an e-mail message, as a web app notification, etc.), a service team (e.g., associated with the consumer electronic device, an application executing on the consumer electronic device, and/or switching device 204), and/or a third party associated with the consumer electronic device (e.g., an administrator of an organization that houses the consumer electronic device, a staff member of such organization, etc.) that the consumer electronic device is in the state associated with the one or more reference power signatures. Subsequent to notifying the user, service team, and/or third party, system 200 may receive a command from the notified entity to perform one or more other actions. Alternatively, system 200 may receive such a command prior to performing steps of flowchart 400 and automatically perform the one or more other actions in response to determining that the consumer electronic device is in the state associated with one or more reference power signatures. For example, FIG. 4B is a flowchart 420 of a process for transmitting a command to a consumer electronic device in response to determining that the consumer electronic device is in a state associated with one or more reference power signatures, according to an exemplary embodiment. The method of flowchart 420 may be implemented by system 200 as described above in reference to FIG. 2. Accordingly, flowchart 420 will be described with continued reference to system 200 of FIG. 2. Other structural and operational embodiments will be apparent to persons skilled in the relevant art(s) based on the following discussion regarding flowchart 420 and system 200.

Flowchart 420 includes step 422. In step 422, a command to display a message is transmitted to the consumer electronic device. For instance, in response to state identification component 216 determining that the consumer electronic device is in the state associated with the one or more reference power signatures, action determination component 228 transmits a command to display a message to the consumer electronic device. In accordance with an embodiment, prior to performing steps of flowchart 400 as described above with respect to FIG. 4A, switching device 204 receives instructions from a third party to cause action determination component 228 to transmit the command to the consumer electronic device if state identification component 216 is in the state associated with the one or more reference power signatures. As anon-limiting example, the consumer electronic device is a television (one of sink device(s) 206) in a patient's room at a nursing home. In this example, control interface 232 receives instructions from an employee (e.g., a nurse) at the nursing home to display a message on the television if the television is on. Switching device 204 performs steps of flowchart 400 to determine if the television is on, and, if so, action determination component 228 transmits a command to display the message to the television.

Figure 4C:
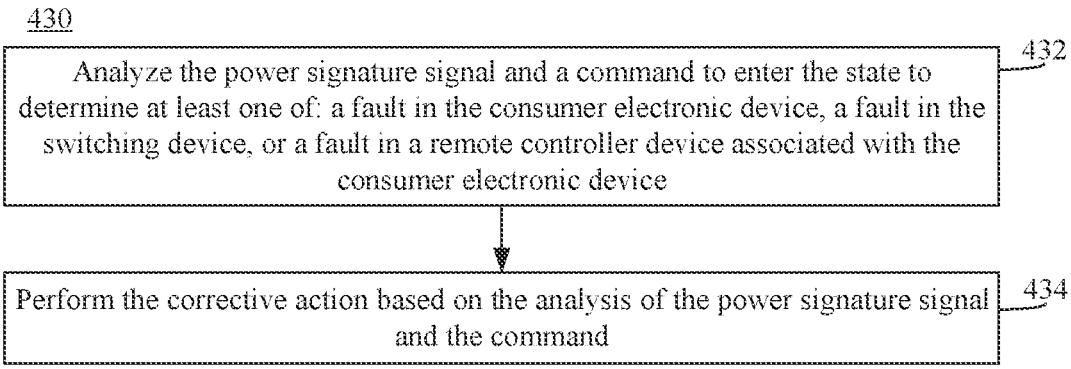
FIG. 4C is a flowchart of a process for performing a corrective action, according to an exemplary embodiment.

As discussed herein, corrective actions may be performed in various ways. For instance, switching device 204 may receive a command for a consumer electronic device (e.g., one or more of sink device(s) 206 and/or source device(s) 202) to enter a state. In this context, switching device 204 may perform steps of flowchart 400 as described above with respect to FIG. 4A to confirm that the consumer electronic device entered the requested state. If switching device 204 determines that the consumer electronic device did not enter the requested state, a corrective action is performed. For example, FIG. 4C is a flowchart 430 of a process for performing a corrective action, according to an exemplary embodiment. The method of flowchart 430 may be implemented by system 200 as described above in reference to FIG. 2. Accordingly, flowchart 430 will be described with continued reference to system 200 of FIG. 2. Other structural and operational embodiments will be apparent to persons skilled in the relevant art(s) based on the following discussion regarding flowchart 430 and system 200.

Flowchart 430 begins with step 432. In step 432, the power signature signal and a command to enter a state are analyzed to determine at least one of: a fault in the consumer electronic device, a fault in the switching device, or a fault in a remote controller device associated with the consumer electronic device. For instance, in accordance with an embodiment, state identification component 216 is configured to analyze the power signature signal and the command to enter the state to determine a fault in the consumer electronic device (e.g., one or more of source device(s) 202 and/or sink device(s) 206), a fault in switching device 204, and/or a fault in a remote controller device associated with the consumer electronic device. Example faults include, but are not limited to, a failure of a power supply of the consumer electronic device, switching device 204, and/or the remote controller device, a failure of a port of the consumer electronic device and/or one of ports 234, a failure of the consumer electronic device, switching device 204 and/or the remote controller device to connect to a network (e.g., due to a failure of a network adapter, an external network component (e.g., a modem, a router, etc.), or the network), a failure of the consumer electronic device to launch, close, and/or execute an application, and/or any other error that indicates a fault in the consumer electronic device from entering the requested state.

In accordance with an embodiment, the analysis performed by state identification component 216 in step 432 determines a fault in a communication link between one or more of the consumer electronic device, switching device 204, and/or the remote controller device (e.g., one or more wired communication links (e.g., communication via an HDMI cable, an optical cable, a universal serial bus (USB) cable, an Ethernet cable, etc.), wireless communication links (e.g., communication via Bluetooth, Wi-Fi, infrared, etc.), or a combination of wired and wireless communication links).

In accordance with an embodiment, the analysis performed by state identification component 216 in step 432 determines a fault in power monitor(s) 208. For instance, state identification component 216 may determine a fault in a sensing component of power monitor(s) 208, another component of power monitor(s) 208, a communication link between power monitor(s) 208 and one or more of the consumer electronic device and/or switching device 204, and/or any other error that indicates a fault in the operation of power monitor(s) 208.

The analysis of the power signature signal and the command may be performed in various ways. For instance, in accordance with an embodiment, state identification component 216 performs behavior analysis on the consumer electronic device, switching device 204, the remote controller device, and/or power monitor(s) 208 in order to determine the at least one of the fault in the consumer electronic device, the fault in switching device 204, the fault in the remote controller device, a communication link, and/or power monitor(s) 208. Examples of behavior analysis include, but are not limited to, comparing the power signature signal to historic power signature signals over time, analyzing performance of the consumer electronic device, switching device 204, the remote controller device and/or power monitor(s) 208 over time, analyzing previous detected errors and/or faults, analyzing previous calibrations of power signature files 236, analyzing trends in power signature signals and/or device performance over time, and/or any other type of behavior analysis suitable for determining at least one fault in the consumer electronic device, switching device 204, and/or the remote controller device. In accordance with an embodiment, state identification component 216 measures a voltage level of the remote controller device (and/or a battery thereof) to determine a fault in the remote controller device (e.g., to determine that the battery voltage of the remote controller device is low or zero). In accordance with an embodiment, state identification component 216 prompts a user (e.g., to input another command or to confirm a state) as part of the analysis. In accordance with an embodiment, state identification component 216 transmits information regarding the power signature signal and the command to a computing device of a service team in a manner that enables the computing device of the service team to perform some or all of the analysis.

To better illustrate a running example according to step 432, suppose a user issued a command to increase the volume of a TV and state identification component 216 determined (e.g., via techniques described with respect to steps 402-406 of flowchart 400 as described with respect to FIG. 4A) that the TV did not enter a state that indicates the volume of the TV was increased. For instance, switching device 204 receives a power signature signal associated with the TV and compares the received power signature signal with one or more reference power signatures associated with the volume output by the TV being increased. The one or more reference power signatures may be calibrated based on power consumed by a speaker of the TV outputting audio at an increased volume, calibrated based on a GUI element indicating the volume of the TV is increased/increasing being displayed on the TV, and/or otherwise calibrated to indicate the TV entered a state associated with increasing volume of an audio output of the TV (or a speaker associated with the TV). If the level of similarity between the received power signature signal and the one or more reference power signatures does not meet a threshold condition, state identification component 216 performs an analysis to determine a fault in the TV, a fault in switching device 204, and/or a fault in a remote controller device associated with the TV. For instance, state identification component 216 analyzes the command issued by the user, signals output by the remote controller (e.g., an IR signal), and the power signature signal of the TV. In this running example, based on the analysis, state identification component 216 determines a fault in the TV.

In step 434, a corrective action is performed based on the analysis of the power signature signal and the command. For instance, state identification component 216 may request a corrective action, as described elsewhere herein, based on the analysis of the power signature signal and the command. In accordance with an embodiment, switching device 204 performs and/or requests multiple corrective actions simultaneously or sequentially, as described elsewhere herein.

Continuing the running example described above with respect to step 432, subsequent to determining the fault in the TV, state identification component 216 issues a prompt to the user (e.g., via action determination component 228 issuing a command to the TV or another sink device to display a message to the user, via control interface 232 issuing such a command to the TV, via network interface 240 issuing such a command to the TV, and/or via transmitting ("pushing") a notification to another device (e.g., a cellular phone, a tablet, a computer, sink device(s) 206, source device(s) 204, etc.)) indicating the determined fault in the TV. In accordance with an embodiment, the prompt indicates a potential fault in the TV, e.g., a power failure in the TV, a failure in an IR sensor of the TV, a failure in another component of the TV. In accordance with an embodiment, the prompt includes a suggested step for the user to remedy the fault in the TV. For example, if state identification component 216 determined the IR sensor of the TV has failed (or has potentially failed), the prompt includes a message stating "Your attempt to increase the volume failed, please check to see if the IR sensor on your TV is blocked."

Continuing the running example, in accordance with an embodiment, the prompt to the user also asks the user to confirm (e.g., via the remote controller) if the IR sensor was blocked and the user remedied the fault. In response to receiving confirmation that the IR sensor was blocked, switching device 204 may reattempt to increase the volume of the TV. If the volume does not increase, state identification component 216 repeats steps 432 and 434 of flowchart 430 based on a new power signature signal and the user's response to the prompt. In embodiments, this process may repeat until either the determined fault(s) in the TV, remote controller, and/or switching device 204 are remedied and/or the user or switching device 204 determine that third party intervention (e.g., via a service team) is required.

FIG. 4C has been described above with respect to a non-limiting running example where a fault in a TV has been determined and an error message is provided to a user. It is also contemplated herein that other error messages may be issued to users and/or service teams associated with a consumer electronic device, a remote controller, and/or switching device 204 based on faults determined by state identification component 216. For example, switching device 204 may determine a fault in a network that switching device 204, the consumer electronic device, and/or the remote controller are communicatively coupled to thereby. In this example, switching device 204 issues an error message to a service team associated with the network (e.g., or stores information associated with the fault to issue to the service team once the network is restored).

In another example, switching device determines that a TV is not displaying particular content because the particular content is not available for display (e.g., the service that provides the content is down, the particular content is restricted, or the particular content is incompatible with the TV). In this example, switching device provides an error message to the user (e.g., via the TV or another device associated with the user) indicating the reason (and optionally a prompt for user input) the particular content is not available for display (e.g., a message stating "The requested content cannot be displayed because the service is down [for maintenance/due to an outage/due to an error] [until time/date/number of minutes/hours/days]", a message stating "The requested content is age restricted, please verify your date of birth to access this content" and providing a method for the user to verify their date of birth (e.g., by logging into a personal account, by providing a date input in a drop down menu of an app, etc.), or a message stating "The requested content cannot be displayed on this device [because the device software is out of date/because the content format is incompatible with this device/etc.]").

Figure 5:
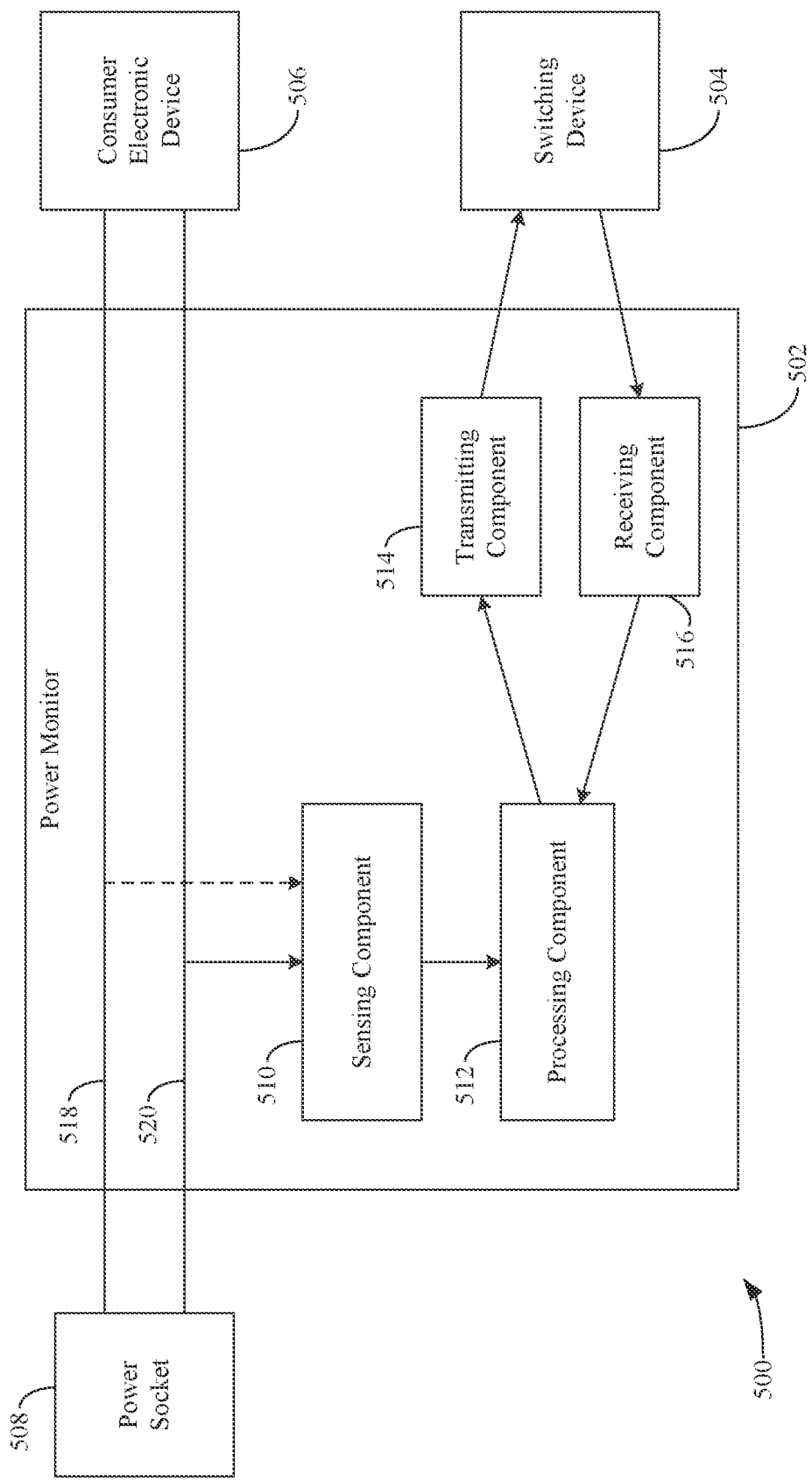
FIG. 5 is a block diagram of a power monitor configured to monitor power consumed by a consumer electronic device, according to an exemplary embodiment.

Turning now to FIG. 5, an exemplary implementation of a system 500 including a power monitor 502 is shown in accordance with an example embodiment. Power monitor 502 may be a further embodiment of power monitor 106 as described with respect to FIG. 1 and/or power monitor(s) 208 as described with respect to FIG. 2. Power monitor 502 may include and/or encompass the embodiments described herein. That is, power monitor 502 is configured to perform methods and/or functions as described in embodiments using components and/or sub-components of the described embodiments. For instance, power monitor 502 is configured to monitor power signals from one or more source device(s) and/or sink device(s) coupled thereto and provide power signature signals to one or more switching devices coupled thereto.

Power monitor 502 may be coupled to switching device 504, a consumer electronic device 506, and/or a power socket 508. Power monitor 502 may be configured to measure an amount of current provided to consumer electronic device 506 and responsively provide a power signature signal to switching device 504 (e.g., via a port of switching device 504 to which power monitor 502 is coupled, via a control interface of switching device 504 to which power monitor 502 is coupled, or via a network interface of switching device 504 to which power monitor 502 is coupled). Switching device 504 may be an example of switching device 204, as described above in reference to FIG. 2. Consumer electronic device 506 may be an example of source device(s) 202 and/or sink device(s) 206, as described above in reference to FIG. 2.

As shown in FIG. 5, power monitor 502 may include a sensing component 510, a processing component 512, a transmitting component 514, and/or a receiving component 516. As further shown in FIG. 5, power monitor 502 includes a first conductive element 518 and a second conductive element 520. First conductive element 518 is configured to provide power to consumer electronic device 506 when coupled to a corresponding prong of an electrical plug of a power cord that is coupled to consumer electronic device 506 and a corresponding receptacle of power socket 508. First conductive element 518 may be referred to as a live conductive element. Second conductive element 520 is configured to return power back to power socket 508 when coupled to a corresponding prong of an electrical plug of a power cord that is coupled to consumer electronic device 506 and a corresponding receptacle of power socket 508. Second conductive element 520 may be referred to as a neutral conductive element.

Sensing component 510 may be configured to measure an amount of current being provided to consumer electronic device 506 (or measure another other operational characteristic). For example, sensing component 510 may be coupled to second conductive element 520 and may be configured to measure an amount of analog current being provided via second conductive element 520. Sensing component 510 may provide the measurement of the current to processing component 512.

In accordance with an embodiment, the amount of current is measured using a resistive element having a known resistance. For example, a shunt resistor may be coupled to second conductive element 520. Sensing component 510 may be configured to determine the voltage across the shunt resistor. In accordance with such an embodiment, sensing component 510 determines the amount of current being provided to electronic device 506 based on the determined voltage across the shunt resistor and the known resistance of the shunt resistor.

In accordance with another embodiment, sensing component 510 comprises a current transformer. The current transformer may comprise a primary winding that is coupled to second conductive element 520 and measures the amount of current provided by second conductive element 520. The current transformer may also comprise a secondary winding that produces a current which is proportional to the current being measured by the primary winding. The current produced by the secondary winding is indicative of the amount of current being provided to electronic device 506.

In accordance with yet another embodiment, sensing component 510 comprises a Hall effect current sensor. The Hall effect current sensor may be coupled to second conductive element 520 and may be configured to measure a magnetic field generated by second conductive element 520 as current flows through second conductive element 520. The Hall effect current sensor provides an analog voltage output that is proportional to the strength of the magnetic field and current flowing through neutral conductive element 520. In accordance with such an embodiment, sensing component 510 determines a measure of the current being provided to the electronic device using the measured voltage.

It is noted that while sensing component 510 is coupled to second conductive element 520 in the above-described embodiments, in accordance with other embodiments, sensing component 510 is coupled to first conductive element 518 and may determine the amount of current being provided to the electronic device using any of the techniques described above. It is further noted that the current sensing techniques described above are purely exemplary and that other current sensing techniques may be used to measure the amount of current being provided to consumer electronic device 506.

Processing component 512 may be configured to receive the measured current from sensing component 510. Processing component 512 may comprise an analog-to-digital converter that converts the measured current to a digital signal. The digital signal may be an indication that indicates the measured amount of current provided to consumer electronic device 506. Processing component 512 may be further configured to provide the indication to transmitting component 514.

Transmitting component 514 may be configured to transmit the indication to switching device 504. In accordance with an embodiment, transmitting component 514 is configured to provide (e.g., via a port of, a control interface of, and/or a network interface of switching device 504 to which power monitor 502 is coupled to) the indication to switching device 504 via a wired connection (e.g., via a USB cable, a coaxial cable, etc.). In accordance with another embodiment, the indication is provided (e.g., via a control interface of and/or a network interface of switching device 504 to which power monitor 502 is coupled to) to switching device 504 via a wireless connection (e.g., via IR communication, RF communication, etc.). In accordance with the latter embodiment, processing component 512 and/or transmitting component 514 may be further configured to format the indication in accordance with the wireless communication scheme used to transmit the indication. In further accordance with such an embodiment, transmit component 514 may comprise an antenna that wirelessly transmits the indication to switching device 504.

Receiving component 516 may be configured to receive signals from switching device 504 and provide the received signals to processing component 512. In accordance with an embodiment, receiving component 516 is configured to receive the signals (e.g., via a port of, a control interface of, and/or a network interface of switching device 504 to which power monitor 502 is coupled to) from switching device 504 via a wired connection (e.g., via a USB cable, a coaxial cable, etc.). In accordance with another embodiment, the signals are received (e.g., via a control interface of and/or a network interface of switching device 504 to which power monitor 502 is coupled to) from switching device 504 via a wireless connection (e.g., via IR communication, RF communication, etc.). In accordance with such an embodiment, receiving component 516 comprises an antenna that wirelessly receives the signals from switching device 504. In some embodiments, the same antenna is used by transmitting component 514 and receiving component 516.

In some embodiments, the indication provided to switching device 504 by power monitor 502 is a power signature signal, as described elsewhere herein. However, it is also contemplated that the indication provided to switching device 504 may be a signal indicating the state of consumer electronic device 506. For example, power monitor 502 may include components similar to signature calibration component 238, state identification component 216, storage(s) 222, identification component 226, and/or other components of switching device 204, as described with respect to FIG. 2 above. In this context, power monitor 502 may determine the state of consumer electronic device 506 and responsively provide the indication indicating the state to switching device 504.

It is noted that in accordance with certain embodiments, one or more components of power monitor 502 may be incorporated into an electrical plug or power cord of electronic device 506. For example, sensing component 510, processing component 512, transmitting component 514, and/or receiving component 516 may be incorporated into the electrical plug or power cord. In accordance with such embodiments, a separate socket device is not required. Instead, the foregoing techniques may be achieved by the electrical plug or power cord including such components. In accordance with another embodiment, one or more components of power monitor 502 may be incorporated into switching device 504, as described elsewhere herein.

III. FURTHER EXAMPLE EMBODIMENTS AND ADVANTAGES

One or more embodiments described herein may perform their functions according to the flowcharts described herein. Additional structural and operational embodiments will be apparent to persons skilled in the relevant art(s) based on the discussions regarding the flowcharts and embodiments herein. In some example embodiments, one or more of the steps of the described flowcharts may not be performed. Moreover, steps in addition to or in lieu of the steps of the described flowcharts may be performed (some of which were described above). Further, in some example embodiments, one or more of the steps of the described flowcharts may be performed out of the order shown or described, in an alternate sequence, and/or partially (or completely) concurrently with other steps.

Reference power signatures may be stored in various storages internal and/or external to a system, in embodiments. For example, embodiments described herein describe reference power signatures stored in power signature file(s) 236 in storage(s) 222 of switching device 204. However, it is further contemplated that reference power signatures may be stored external to switching device 204. For example, reference power signatures may be stored in an external storage device (e.g., a SD (Secure Digital) card, an external hard drive, a flash drive, etc.) and/or a cloud network. In accordance with an embodiment where reference power signatures are stored in a cloud network, reference power signatures may be shared between multiple switching devices. For example, reference power signatures may be made anonymous and stored in a cloud network operated by a service provider (e.g., manufacturer of switching device 204). In this context, other switching devices may access reference power signatures stored in the cloud network. In this way, the signature calibration process of a switching device (e.g., switching device 204) may be expedited. For example, during the signature calibration process, signature calibration component 238 may determine that one of sink device(s) 206 has one or more reference power signatures stored in a cloud network. In this example, signature calibration component 238 may skip the calibration process for the states associated with the reference power signatures stored in the cloud network. In accordance with an embodiment, signature calibration component 238 may copy reference power signatures stored in the cloud network to power signature file(s) 236.

The embodiments and techniques described herein may be used to form a log of states of consumer electronic devices. For example, with respect to FIG. 2, state identification component 216 may periodically update reference power signatures in response to received power signature signals. For instance, if a consumer electronic device is determined to be in a state, state identification component 216 may store the received power signature signal as a reference power signature associated with that state and consumer electronic device. In accordance with an embodiment, the updated reference power signature overwrites a previous reference power signature associated with that state and consumer electronic device. In accordance with an alternative embodiment, the updated reference power signature is stored in addition to one or more previous reference power signatures associated with that state and consumer electronic device. In this context, changes in power signatures for a consumer electronic device operating in a state may be monitored over time.

Moreover, power signature signals may be logged over time to determine content displayed on a consumer electronic device (e.g., a television). For example, switching device 204 may determine a particular movie, videogame, television show, etc., is displayed on a television (e.g., sink device(s) 206). In this example, power monitor 208 may monitor a power signature signal associated with the television and switching device 204 may store the power signature signal as a reference power signature associated with the content displayed on the consumer electronic device.

The embodiments described herein have described power signature signals and reference power signatures as measured power levels or current levels over time. However, it is also contemplated herein that power signature signals and/or reference power signatures may be converted to other forms or units of data. In accordance with an embodiment, the power signature signal associated with the content is stored as percentages of power used to display video. For example, the percentage of displayed power for any given value may be calculated using the following equation:

$$\% \text{ of Displayed Power} = \frac{P_{MEASURED} - P_{MIN}}{P_{MAX} - P_{MIN}} \quad \text{Eq. 1}$$

Where $P_{MEASURED}$ is the power output by the power monitor (e.g., power monitor(s) 208), $P_{MIN}$ is the power consumed when displaying a completely black screen (e.g., 50 W), and $P_{MAX}$ is the power consumed when displaying a completely white screen (e.g., 120 W). In this way, a power signature signal may be stored as a collection of percentages of power used to display video.

Further, the percentages of power used to display video may be brand and/or device agnostic, in embodiments. For example, the amount of power used to display a particular video, user interface, content, or the like may be substantially similar across multiple devices and/or brands. In a non-limiting example, a power signature signal associated with a television may be measured by a power monitor (e.g., power monitor(s) 208) and provided to signature calibration component 238 while a movie is displayed on the television.

In this example, the power signature signal is stored as a reference power signature in power signature file(s) 236. The reference power signature may be converted to a curve of percentages of power used over time by switching device 204, a component of switching device 204 (e.g., signature calibration component 238), or an external device and/or service (e.g., a service provider system). The converted reference power signature may be stored in storage(s) 222, an external storage device, and/or a cloud network. In a further example where the converted reference power signature is stored in a cloud network, the converted reference power signature may be accessed by other switching devices either during respective signature calibration or state identification processes. In this context, reference power signatures may be used across multiple devices and/or brands to identify states agnostic to brand and/or device model. In this way, reference power signatures may be attributed to displaying content and/or user interfaces on any consumer electronic device of a type of consumer electronic devices (e.g., any television).

The embodiments and techniques described herein may use the percentages of power used to display video in order to identify a source device (e.g., source device(s) 202) switched to display content on a sink device (e.g., sink device(s) 206). For example, switching device 204 may have a first port of ports 234 switched to the port a source device is coupled to for providing audio/video signals and a second port of ports 234 switched to the port a TV is coupled to for outputting audio/video signals. Switching device 204 may send a command or series of commands to the source device (e.g., "Menu", "Back", "Up", "Down", "Select", etc.) in order to show a particular image (e.g., a particular graphical user interface screen) or video on the TV. A power monitor (e.g., power monitor(s) 208) may provide a power signature signal to identification component 226. Identification component 226 may analyze the received power signature signal to determine the device type and/or brand of the source device. The received power signature signal may be converted to percentages of power used to display video, as described elsewhere herein. In this context, identification component 226 may determine the device type and/or brand of the source device by comparing a converted power signature signal to reference power signatures. In a non-limiting example, a first reference power signature indicates that a first brand (e.g., Roku™) of a source device (e.g., a streaming media device) consumes a first percentage of power used to display video when displaying a home screen and a second reference power signature indicates that a second brand (e.g., AppleTV™) of a source device (e.g., a streaming media device) consumes a second percentage of power used to display video when displaying a home screen, different from the first percentage. In this non-limiting example, the received converted power signature signal may be compared to both the first reference power signature and the second power signature to determine the brand and/or type of source device displaying content on the TV. In this way, identification component 226 may determine identifier(s) associated with the source device by comparing a received power signature signal to one or more reference power signatures.

The embodiments and techniques described herein have been described with respect to determining states of consumer electronic devices based on monitored power signals. It is contemplated herein that received power signature signals and/or reference power signatures may be adjusted depending on one or more factors. For example, a TV may adjust its display based on time of day or ambient lighting conditions (e.g., by implementing a blue light filter, entering a day mode, entering a night mode, etc.). In this context, signature calibration component 238 may calibrate power signatures for each mode and/or condition the TV may operate in. Alternatively, switching device 204 may apply an adjustment to either the received power signature signal or the stored reference power signature depending on the operating mode the TV is currently in and/or was in when the reference power signatures were calibrated. For example, suppose a TV consumes a percentage of its normal operating power (e.g., 10% reduction) when operating in a night mode. In this example, if a power signature signal is received while the TV is operating in night mode, switching device 204 (or a component thereof) may adjust the power signature signal to normalize it with respect to the reference power signatures.

The embodiments and techniques described herein have been described with respect to measuring power consumption of a TV to determine the state the TV is operating in. However, it is further contemplated that power consumption of other consumer electronic devices (e.g., sink devices and/or source devices) may be measured to determine the state of the consumer electronic device. For example, the power consumption of consumer electronic devices such as soundbars, speaker(s), monitors, DVD players, Blu-ray players, videogame consoles, streaming media devices, HDTVs, projectors, etc., may be measured to determine their respective operating states. In accordance with an embodiment, each consumer electronic device of may have a separate power monitor. In accordance with another embodiment, a power monitor may monitor power signals of multiple consumer electronic devices. For example, a power monitor may be implemented within a power strip that monitors power signals of each consumer electronic device plugged into the power strip.

It is also noted that while the embodiments described above disclose that the power state determinations are performed by a switching device (e.g., switching device 204, as shown in FIG. 2), the embodiments described herein are not so limited. For instance, such embodiments may be performed by a standalone device communicatively coupled to source device(s) 202, sink device(s) 206, power monitors(s) 208, and/or switching device 204. In another example, the embodiments described herein may be performed via a network-based service (e.g., a cloud-based service) configured to analyze data provided by power monitor(s) 208 and determine power state signatures of monitored devices.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

Figure 6:
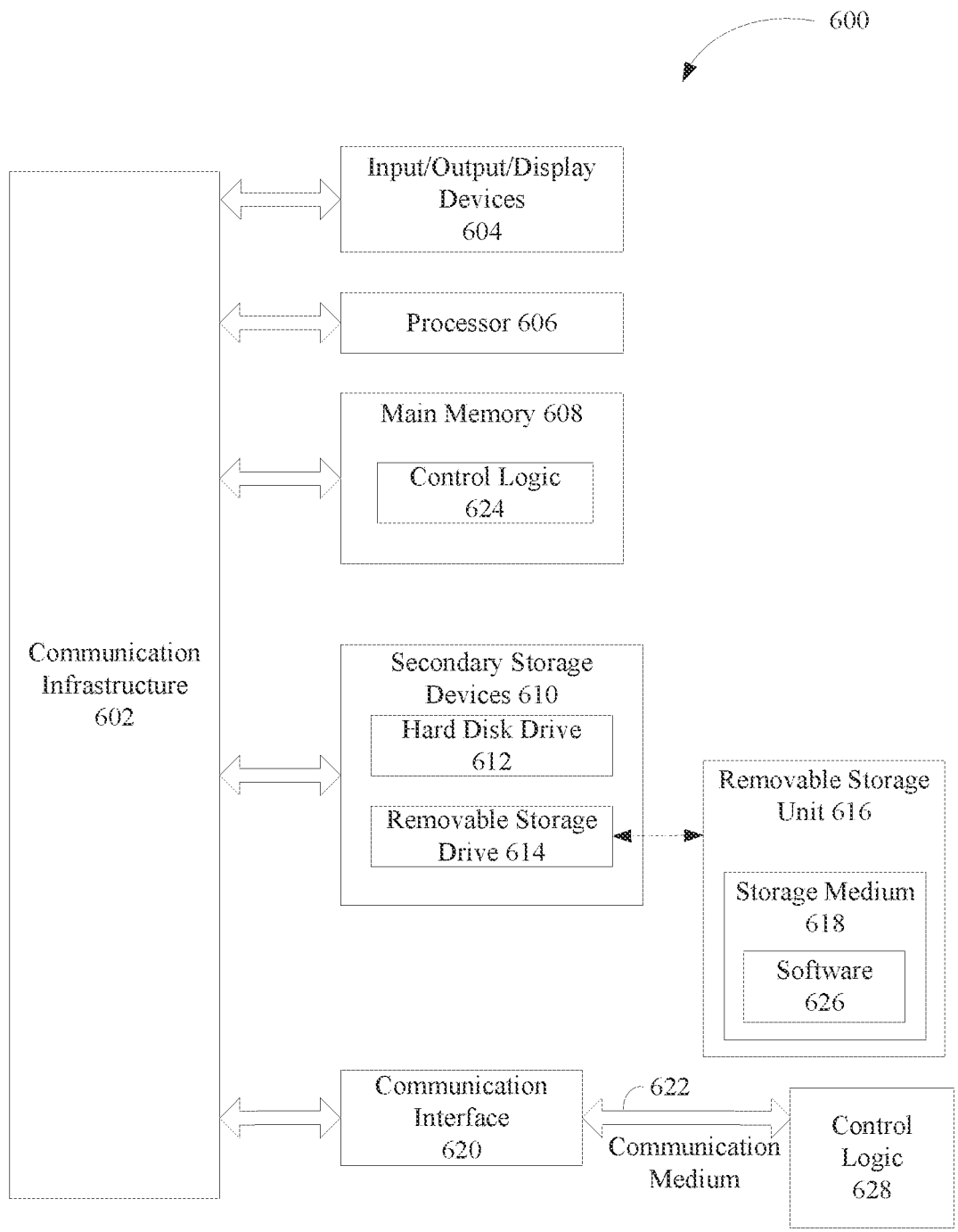
FIG. 6 is a block diagram of a computer system, according to an exemplary embodiment.

The embodiments described herein, including systems, methods/processes, devices, and/or apparatuses, may be implemented using well known processing devices, telephones (smart phones and/or mobile phones), tablet computers, servers, and/or, computers, such as a computer 600 shown in FIG. 6. It should be noted that computer 600 may represent communication devices, processing devices, servers, and/or traditional computers in one or more embodiments. For example, the automatic state characteristics, state signatures and action determinations for consumer electronic devices coupled to HDMI switch embodiments, and any of the sub-systems or components respectively contained therein, may be implemented using one or more computers 600 or portions thereof.

Computer 600 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 600 may be any type of computer, including a desktop computer, a server, etc.

Computer 600 includes one or more processors (also called central processing units, or CPUs), such as a processor 606. Processor 606 is connected to a communication infrastructure 602, such as a communication bus. In some embodiments, processor 606 can simultaneously operate multiple computing threads.

Computer 600 also includes a primary or main memory 608, such as random access memory (RAM). Main memory 608 has stored therein control logic 624 (computer software), and data.

Computer 600 also includes one or more secondary storage devices 610. Secondary storage devices 610 include, for example, a hard disk drive 612 and/or a removable storage device or drive 614, as well as other types of storage devices, such as memory cards and memory sticks. For instance, computer 600 may include an industry standard interface, such a universal serial bus (USB) interface for interfacing with devices such as a memory stick. Removable storage drive 614 represents a floppy disk drive, a magnetic tape drive, a compact disk drive, an optical storage device, tape backup, etc.

Removable storage drive 614 interacts with a removable storage unit 616. Removable storage unit 616 includes a computer useable or readable storage medium 618 having stored therein computer software 626 (control logic) and/or data. Removable storage unit 616 represents a floppy disk, magnetic tape, compact disk, DVD, optical storage disk, or any other computer data storage device. Removable storage drive 614 reads from and/or writes to removable storage unit 616 in a well-known manner.

Computer 600 also includes input/output/display devices 604, such as touchscreens, LED and LCD displays, monitors, keyboards, pointing devices, etc.

Computer 600 further includes a communication or network interface 620. Communication interface 620 enables computer 600 to communicate with remote devices. For example, communication interface 620 allows computer 600 to communicate over communication networks or mediums 622 (representing a form of a computer useable or readable medium), such as LANs, WANs, the Internet, etc. Network interface 620 may interface with remote sites or networks via wired or wireless connections.

Control logic 628 may be transmitted to and from computer 600 via the communication medium 622.

Any apparatus or manufacture comprising a computer useable or readable medium having control logic (software) stored therein is referred to herein as a computer program product or program storage device. This includes, but is not limited to, computer 600, main memory 608, secondary storage devices 610, and removable storage unit 616. Such computer program products, having control logic stored therein that, when executed by one or more data processing devices, cause such data processing devices to operate as described herein, represent embodiments of the invention.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media and transitory signals (do not include communication media and transitory signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media and signals transmitted over wired media. Embodiments are also directed to such communication media.

The techniques and embodiments described herein may be implemented as, or in, various types of devices. For instance, embodiments may be included, without limitation, in processing devices (e.g., illustrated in FIG. 6) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 606 of FIG. 6), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

IV. CONCLUSION

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method, comprising:
   receiving, in a switching device, a first power signature signal associated with a first consumer electronic device;
   comparing the first power signature signal to one or more reference power signatures, wherein at least one of the one or more reference power signatures is indicative of a variation of a power characteristic of the first consumer electronic device over a time window;
   determining whether a level of similarity between the first power signature signal and the one or more reference power signatures meets a threshold condition;
   in response to determining that the level of similarity between the first power signature signal and the one or more reference power signatures meets the threshold condition, determining that the first consumer electronic device is in a first state associated with the one or more reference power signatures; and
   in response to determining that the level of similarity between the first power signature signal and the one or more reference power signatures does not meet the threshold condition, performing a corrective action.

2. The method of claim 1, wherein the first state comprises:
   a powered off state;
   a powered on state; or
   a standby state.

3. The method of claim 1, wherein:
   the method further comprises issuing a command to the first consumer electronic device to enter the first state;
   said comparing the first power signature signal to the one or more reference power signatures comprises comparing the first power signature signal to a reference power signature indicative of the first state; and
   said performing the corrective action comprises:
      analyzing the first power signature signal and the command to determine at least one of a fault in the first consumer electronic device, a fault in the switching device, or a fault in a remote controller device associated with the first consumer electronic device; and
      performing the corrective action based on the analysis of the first power signature signal and the command.

4. The method of claim 1, further comprising:
   in response to determining that the first consumer electronic device is in the first state, transmitting a command to display a message to the first consumer electronic device.

5. The method of claim 1, wherein said performing the corrective action comprises one or more of:
   sending a request for a second power signature signal associated with the first consumer electronic device;
   recalibrating a power signature file associated with the first consumer electronic device;
   reporting an error to a computing device of a service team;
   reporting an error to a computing device of a user; or
   reporting an error to the first consumer electronic device.

6. The method of claim 1, further comprising:
   sending a command to enter a second state to the first consumer electronic device;
   sending a request for confirmation that the first consumer electronic device entered the second state;
   in response to receiving, by the switching device, confirmation that the first consumer electronic device entered the second state, receiving a second power signature signal representative of the power consumed by the first consumer electronic device in the second state; and
   storing the second power signature signal as a reference power signature of the one or more reference power signatures.

7. The method of claim 3, wherein the command comprises:
   a first command to power on the first consumer electronic device;
   a second command to power off the first consumer electronic device;
   a third command to display video content on the first consumer electronic device;
   a first operational command associated with the first consumer electronic device; or
   a second operational command associated with a second consumer electronic device.

8. The method of claim 5, wherein the command to enter the second state includes instructions to display a white screen.

9. A switching device comprising:
   a plurality of ports, at least one of the plurality of ports communicatively coupled to a consumer electronic device; and
   a state identification component that:
      receives a first power signature signal associated with the consumer electronic device;
      compares the first power signature signal to one or more reference power signatures, wherein at least one of the one or more reference power signatures is indicative of a variation of a power characteristic of the consumer electronic device over a time window;
      determines that a level of similarity between the first power signature signal and the one or more reference power signatures meets a threshold condition; and
      in response to determining that the level of similarity between the first power signature signal and the one or more reference power signatures meets the threshold condition, determines that the consumer electronic device is in a first state associated with the one or more reference power signatures.

10. The switching device of claim 9, further comprising an action determination component that, in response to the state identification component determining that the consumer electronic device is in the first state, issues a command to display a message to the consumer electronic device.

11. The switching device of claim 9, wherein:
the state identification component further:
receives a second power signature signal associated with the consumer electronic device;
compares the second power signature signal to the one or more reference power signatures; and
determines that a level of similarity between the second power signature signal and the one or more reference power signatures does not meet the threshold condition; and
the switching device, in response to the state identification component determining that the level of similarity between the second power signature signal and the one or more reference power signatures does not meet the threshold condition, performs a corrective action.

12. The switching device of claim 9, wherein the switching device further comprises a signature calibration component that:
sends a command to enter a second state to the consumer electronic device;
sends a request for confirmation that the consumer electronic device entered the second state;
in response to the switching device receiving confirmation that the consumer electronic device entered the second state, receives a second power signature signal representative of the power consumed by the consumer electronic device in the second state; and
stores the second power signature signal as a reference power signature of the one or more reference power signatures.

13. The switching device of claim 11, wherein:
the switching device further comprises an action determination component that issues a command to enter the first state to the consumer electronic device;
the one or more reference power signature comprises a reference power signature indicative of the first state; and
the switching device performs the corrective action by:
analyzing the second power signature signal and the command to determine at least one of a fault in the consumer electronic device, a fault in the switching device, or a fault in a remote controller device associated with the consumer electronic device; and
performing the corrective action based on the analysis of the second power signature signal and the command.

14. The switching device of claim 11, wherein the switching device performs the corrective action by sending a request for a third power signature signal associated with the consumer electronic device.

15. A computer-readable storage medium having program instructions recorded thereon that, when executed by a processor circuit perform operations, the operations comprising:
receiving a first power signature signal associated with a consumer electronic device;
comparing the first power signature signal to one or more reference power signatures, wherein at least one of the one or more reference power signatures is indicative of a variation of a power characteristic of the consumer electronic device over a time window;
determining that the first power signature signal is substantially similar to the one or more reference power signatures; and
in response to said determining that the first power signature signal is substantially similar to the one or more reference power signatures, determining that the consumer electronic device is in a first state associated with the one or more reference power signatures.

16. The computer-readable storage medium of claim 15, wherein the operations further comprise:
in response to determining that the consumer electronic device is in the first state, transmitting a command to display a message to the consumer electronic device.

17. The computer-readable storage medium of claim 15, wherein the operations further comprise:
receiving a second power signature signal associated with the consumer electronic device;
comparing the second power signature signal to the one or more reference power signatures;
determining that a level of similarity between the second power signature signal and the one or more reference power signatures does not meet a threshold condition; and
in response to determining that the level of similarity between the second power signature signal and the one or more reference power signatures does not meet the threshold condition, performing a corrective action.

18. The computer-readable storage medium of claim 17, wherein performing the corrective action comprises:
recalibrating a power signature file associated with the consumer electronic device.

19. The computer-readable storage medium of claim 15, wherein the operations further comprise:
sending a command to enter a second state to the consumer electronic device;
sending a request for confirmation that the consumer electronic device entered the second state;
in response to receiving confirmation that the consumer electronic device entered the second state, receiving a second power signature signal representative of the power consumed by the consumer electronic device in the second state; and
storing the second power signature signal as a reference power signature of the one or more reference power signatures.

20. The computer-readable storage medium of claim 17, wherein:
the operations further comprise issuing a command to the consumer electronic device to enter the first state;
said comparing the second power signature signal to the one or more reference power signatures comprises comparing the second power signature signal to a reference power signature indicative of the first state; and
said performing the corrective action comprises:
analyzing the second power signature signal and the command to determine a fault in the consumer electronic device, a fault in a switching device, or a fault in a remote controller device associated with the consumer electronic device; and
performing the corrective action based on the analysis of the second power signature signal and the command.

* * * * *

UNITED STATES PATENT AND TRADEMARK OFFICE
CERTIFICATE OF CORRECTION

Page 1 of 1

PATENT NO. : 12,306,688 B2
APPLICATION NO. : 17/934312
DATED : May 20, 2025
INVENTOR(S) : Einaudi et al.

It is certified that error appears in the above-identified patent and that said Letters Patent is hereby corrected as shown below:

In the Claims

In Column 34, Claim 8, Line 41, delete "claim 5," and insert -- claim 6, --, therefor.

Signed and Sealed this
Twenty-sixth Day of August, 2025

Coke Morgan Stewart
*Acting Director of the United States Patent and Trademark Office*